US010108494B2

(12) United States Patent
Yu et al.

(10) Patent No.: US 10,108,494 B2
(45) Date of Patent: Oct. 23, 2018

(54) RAID CONTROLLER DEVICE AND STORAGE DEVICE CONFIGURED TO RECOVER DATA HAVING UNCORRECTABLE ECC ERROR

(71) Applicant: Samsung Electronics Co., Ltd., Suwon-si, Gyeonggi-do (KR)

(72) Inventors: Geunyeong Yu, Seongnam-si (KR); Junjin Kong, Yongin-si (KR); Beom Kyu Shin, Seongnam-si (KR); Myungkyu Lee, Seoul (KR); Jiyoup Kim, Suwon-si (KR); Dongmin Shin, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 8 days.

(21) Appl. No.: 15/288,227

(22) Filed: Oct. 7, 2016

(65) Prior Publication Data

US 2017/0102996 A1 Apr. 13, 2017

(30) Foreign Application Priority Data

Oct. 8, 2015 (KR) ........................ 10-2015-0141760

(51) Int. Cl.
*G06F 11/10* (2006.01)
*G06F 3/06* (2006.01)

(52) U.S. Cl.
CPC .......... *G06F 11/1092* (2013.01); *G06F 3/064* (2013.01); *G06F 3/0619* (2013.01); *G06F 3/0683* (2013.01)

(58) Field of Classification Search
CPC .................................................. G06F 11/1076
USPC ........................................ 714/764, 766, 770
See application file for complete search history.

(56) References Cited

U.S. PATENT DOCUMENTS 7,302,603 B2 11/2007 Nielsen et al.
8,307,258 B2 11/2012 Flynn et al.
8,495,416 B2 7/2013 Sutardja
8,621,318 B1 12/2013 Micheloni et al.
8,832,524 B2 9/2014 Bennett
2010/0199149 A1 8/2010 Weingarten et al.
(Continued)

FOREIGN PATENT DOCUMENTS

KR 101216735 B1 12/2012

*Primary Examiner* — Fritz Alphonse
(74) *Attorney, Agent, or Firm* — Harness, Dickey & Pierce, P.L.C.

(57) ABSTRACT

A redundant array of inexpensive disks (RAID) controller of a RAID storage system that includes one or more storage devices includes an error correction code (ECC) result manager configured to manage information of ECC result indicators when a data chunk that includes one or more ECC data units having an uncorrectable ECC error is read from among a plurality of data chunks dispersively stored in the one or more storage devices, each of the plurality of data chunks including a plurality of ECC data units, the ECC result indicators respectively indicating whether the plurality of ECC data units included in the plurality of data chunks has an uncorrectable ECC error; and an uncorrectable error counter configured to calculate a number of ECC result indicators indicating an uncorrectable ECC error among ECC result indicators corresponding to ECC data units having a same order in each of the plurality of data chunks.

20 Claims, 19 Drawing Sheets

Start
S110 Read data chunk
S115 Uncorrectable ECC error ?
No
S120 Read next data chunk
Yes
S125 Obtain ECC result indicators
S130 Read next data chunk
S135 Uncorrectable ECC error ?
No
S145 Are all data chunks read ?
No
Yes
S140 Read fail response
Yes
S150 Calculate the number of uncorrectable ECC errors for each order
S155 Recover uncorrectable ECC error in each order
End

(56) References Cited

U.S. PATENT DOCUMENTS

| | | | | |
|---|---|---|---|---|
| 2013/0205183 | A1 | 8/2013 | Fillingim et al. | |
| 2014/0040530 | A1* | 2/2014 | Chen | G06F 11/1068 711/103 |
| 2014/0189421 | A1* | 7/2014 | Werner | G06F 11/2056 714/6.21 |

* cited by examiner

DC[1][1]
DC[1][2]
DC[1][n]
Generate
P[1]
Case A
Case B
DC[1][2]
Recover
DC[1][1]
DC[1][3]
DC[1][n]
P[1]
DC[1][2]
: Uncorrectable ECC Error
1210
1211
Parity Gen/Chk
RAID Controller
1230
1235
ECC Circuit(s)
Storage Device(s)

RAID CONTROLLER DEVICE AND STORAGE DEVICE CONFIGURED TO RECOVER DATA HAVING UNCORRECTABLE ECC ERROR

CROSS-REFERENCE TO RELATED APPLICATIONS

This U.S. non-provisional patent application claims priority under 35 U.S.C. § 119 to Korean Patent Application No. 10-2015-0141760 filed on Oct. 8, 2015, in Korean intellectual Property Office, the entire contents of which are incorporated herein by reference.

TECHNICAL FIELD

At least some example embodiments of the inventive concepts relate to a data management, and more particularly, to a configuration and a method for recovering data having an error.

DESCRIPTION OF THE RELATED ART

Various types of electronic devices are being used these days. A storage device is one example of an electronic device. The storage device stores data and provides the stored data to a user.

In some cases, an error may occur in data stored in a storage device. For example, when an error occurs during an operation of storing data or a characteristic of the storage device is deteriorated, an error may occur in read and write operations of the storage device. Data having the error causes a misoperation or a malfunction of an electronic device, or provides an incorrect service to a user. Thus, several ways for preventing an error of data have been suggested.

Most of storage devices employ an error correction scheme to correct an error of data. For example, when data is stored, the storage device generates an error correction code by means of an error correction code (ECC) circuit. When the stored data is read, the storage device detects and corrects an error of data with reference to the error correction code.

However, an "uncorrectable" error beyond the error correction capability of the ECC circuit may occur. When an uncorrectable error occurs, the storage device outputs a read fail response. If an amount of uncorrectable errors increases, a storage system including a plurality of storage devices may not guarantee correct data.

In some cases, a storage system including a plurality of storage devices is used to improve reliability of data. For example, a redundant array of inexpensive disks (RAID) storage system divides one piece of data into a plurality of "data chunks", and dispersively stores the divided data chunks in the respective storage devices. Since it is unlikely that the plurality of storage devices causes problems concurrently, such a storage system can guarantee high reliability of data.

SUMMARY

At least some example embodiments of the inventive concepts may provide configurations and methods for recovering a data chunk including uncorrectable error in a storage device or system that employs a RAID configuration.

According to at least some example embodiments of the inventive concepts, a redundant array of inexpensive disks (RAID) controller device configured to manage data handling operations of a RAID storage system that includes one or more storage devices includes an error correction code (ECC) result manager configured to manage information of ECC result indicators when a data chunk that includes one or more ECC data units having an uncorrectable ECC error is read from among a plurality of data chunks, the plurality of data chunks being dispersively stored in the one or more storage devices, each of the plurality of data chunks including a plurality of ECC data units, the ECC result indicators respectively indicating whether the plurality of ECC data units included in the plurality of data chunks has an uncorrectable ECC error; an uncorrectable error counter configured to calculate a number of ECC result indicators indicating an uncorrectable ECC error among ECC result indicators corresponding to ECC data units having a same order in each of the plurality of data chunks; and a recovery operator configured to perform a recovery operation to recover, an ECC data unit having an uncorrectable ECC error in a corresponding order when the calculated. number does not exceed a reference value, the recovery operator being configured to perform the recovery operation based on successfully read ECC data units having the corresponding order in each of the plurality of data chunks and a parity having the corresponding order.

The recovery operator may be configured to perform the recovery operation such that, when one data chunk among the plurality of data chunks includes one or more ECC data units having an uncorrectable ECC error, the recovery operator ecovers the one or more ECC data units that are included in the one data chunk and have an uncorrectable ECC error, and the RAID controller device may be configured such that, when two or more data chunks among the plurality of data chunks include one or more ECC data units having an uncorrectable ECC error, the RAID controller device outputs a read fail response.

The recovery operator may be configured such that, when the calculated number does not exceed the reference value, the recovery operator recovers one or more ECC data units having an uncorrectable ECC error in the corresponding order, regardless of a number of data chunks that include one or more ECC data units having an uncorrectable ECC error among the plurality of data chunks.

The RAID controller device may be configured to output a read fail response when the calculated number exceeds the reference value.

The recovery operator may be configured such that, when the calculated number exceeds the reference value, the recovery operator recovers the one or more ECC data units having an uncorrectable ECC error in the corresponding order, based on reliability information, the successfully read ECC data units, and the parity having the corresponding order, and the RAID controller device may be configured to obtain the reliability information by re-reading some or all of data values of the plurality of data chunks from the one or more storage devices.

The RAID controller device may he configured to obtain the reliability information by re-reading only the one or more ECC data units having an uncorrectable ECC error from the one or more storage devices.

The RAID controller device may be configured to re-read some or all of the data values of the plurality of data chunks using a read voltage that is changed such that the reliability information is obtained.

The RAID controller device may be configured such that, when the calculated number exceeds the reference value, the RAID controller device sets a data value of an ECC data unit having lowest reliability among the one or more ECC data units having an uncorrectable ECC error in the corresponding order to the re-read data values, based on the reliability information, and the recovery operator may be configured to recover the one or more ECC data units having an uncorrectable ECC error in the corresponding order, based on the successfully read ECC data units, the parity having the corresponding order, and the ECC data unit having the set data value.

A data size of each of the plurality of data chunks may be larger than a data size of each of the plurality of ECC data units.

A data size of each of the plurality of data chunks may correspond to a data size of a read unit of a read operation that is performed in the one or more storage devices.

According to at least some example embodiments of the inventive concepts, a storage device includes a plurality of nonvolatile memory devices configured to dispersively store a plurality of data chunks, each of the plurality of data chunks including a plurality of ECC data units and a device controller configured to manage data handling operations of the plurality of nonvolatile memory devices, wherein the device controller includes, an error correction code (ECC) circuit configured to, perform an ECC decoding operation, by an ECC unit, on each data chunk from the plurality of data chunks that is read from the plurality of nonvolatile memory devices, and generate an ECC result based on the ECC decoding operation being performed, and a redundant array of inexpensive disks (RAID) controller configured to, manage information of ECC result indicators respectively indicating whether the plurality of ECC data units included in the plurality of data chunks has an uncorrectable ECC error, based on the ECC result, and recover an ECC data unit having an uncorrectable ECC error with reference to the ECC result indicators.

The RAID controller may be configured to receive ECC results of all the plurality of data chunks from the ECC circuit when a data chunk that includes an ECC data unit having an uncorrectable ECC error is read from among the plurality of data chunks.

The RAID controller may be configured such that, when a data chunk that includes an ECC data unit having an uncorrectable ECC error is read from among the plurality of data chunks and a number of ECC data units having an uncorrectable ECC error among ECC data units having a same order in each of the plurality of data chunks does not exceed a reference value, the RAID controller performs a recovery operation to recover an ECC data unit having an uncorrectable ECC error in a corresponding order, the RAID controller being configured to perform the recovery operation based on successfully read ECC data units having the corresponding order in each of the plurality of data chunks and the parity having a corresponding order.

The RAID controller may be configured to perform the recovery operation using only the ECC data unit having an uncorrectable ECC error, one or more ECC data units that have a same order as the ECC data unit having an uncorrectable ECC error, and a parity that has a same order as the ECC data unit having an uncorrectable ECC error.

The device controller may further include a buffer memory configured to store ECC result indicators that have been referred to in order to recover an ECC data unit having an uncorrectable ECC error in a first data chunk among the plurality of data chunks, and the RAID controller may be configured to refer to the stored ECC result indicators in order to recover a second data chunk that includes an ECC data unit having an uncorrectable ECC error among the plurality of data chunks.

According to at least some example embodiments of the inventive concepts, a redundant array of inexpensive disks (RAID) controller device configured control a data read operation of one or more storage devices of a RAID storage system includes a memory storing computer-executable instructions; and one or more processors configured to execute the computer- executable instructions such that the one or more processors are configured to, read data of a data stripe from the one or more storage devices, the data stripe including a plurality of data chunks and at least one parity chunk, each of the plurality of data chunks including a plurality of ECC data units which are included in a plurality of orders, respectively, determine ECC result indicators indicating which data units, from among a first plurality of ECC data units, include a first type of ECC error, the first plurality of ECC data units including each ECC data unit from among the pluralities of ECC data units included in the plurality of data chunks, determine, for each order of the plurality of orders, an error number such that the error number is a number of ECC data units that are included in the order and include the first type of ECC error, and perform a data recovery operation for a first ECC data unit from among the first plurality of ECC data units based on the error number determined for a first order, the first order being the order from among the plurality of orders in which the first ECC data unit is included.

The one or more processors may be configured to execute the computer-executable instructions such that the one or more processors are configured to, perform the data recovery operation for the first ECC data unit when the error number determined for the first order has a first relationship with a reference value, and not perform the data recovery operation for the first ECC data unit when the error number determined for the first order does not have the first relationship with the reference value.

The one or more processors may be configured to execute the computer-executable instructions such that the one or more processors are configured to perform the data recovery operation for the first ECC data unit based on second ECC data units when the error number determined for the first order has the first relationship with the reference value, the second ECC data units being data units of the first plurality of ECC data units that did not include the first type of ECC error, the second ECC data units being data units included in the first order.

The one or more processors may be configured to execute the computer-executable instructions such that the one or more processors are configured to perform the data recovery operation for the first ECC data unit by performing an XOR operation on the second ECC data units and the at least one parity chunk when the error number determined for the first order has the first relationship with the reference value.

The first type of ECC error may be an uncorrectable ECC error.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims.

The accompanying drawings are not to be considered as drawn to scale unless explicitly noted.

DETAILED DESCRIPTION OF EMBODIMENTS

Figure 1:
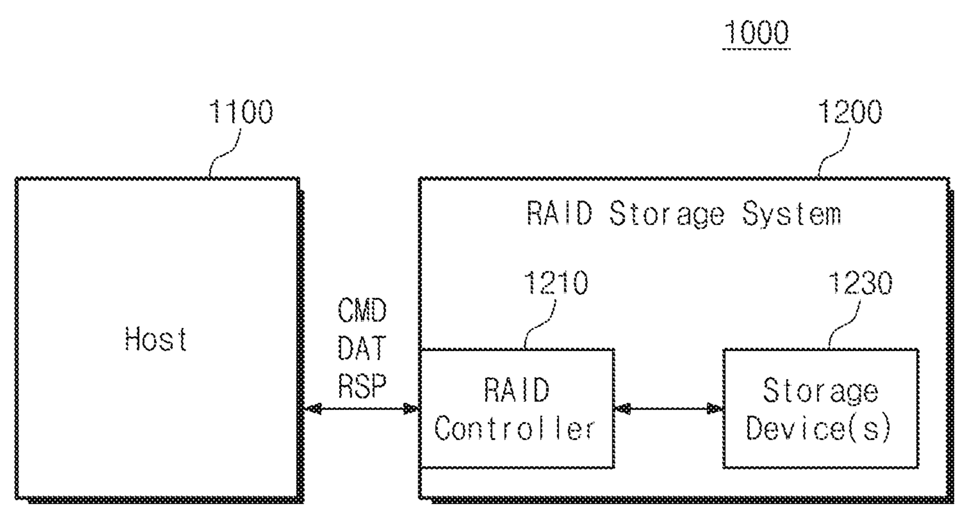
FIG. 1 is a block diagram illustrating an electronic system that includes a RAID storage system in accordance with at least some example embodiments of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term “and/or” includes any and all combinations of one or more of the associated listed items.

It will be understood that when an element is referred to as being “connected” or “coupled” to another element, it may be directly connected or coupled to the other element or intervening elements may be present. In contrast, when an element is referred to as being “directly connected” or “directly coupled” to another element, there are no intervening elements present. Other words used to describe the relationship between elements should be interpreted in a like fashion. (e.g., “between” versus “directly between”, “adjacent” versus “directly adjacent”, etc.).

The terminology used herein is for the purpose of describing particular embodiments only and is not intended to be limiting of example embodiments of the inventive concepts. As used herein, the singular forms “a”, “an” and “the” are intended to include the plural forms as well, unless the context clearly indicates otherwise. It will be further understood that the terms “comprises”, “comprising,”, “includes” and/or “including”, when used herein, specify the presence of stated features, integers, steps, operations, elements, and/or components, but do not preclude the presence or addition of one or more other features, integers, steps, operations, elements, components, and groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to he expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in. a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross--sectional view, an electronic device may include a plurality of the device structures (e.g., memory cell structures or transistor structures), as would be illustrated by a plan view of the electronic device. The plurality of device structures may be arranged in an array and in a two-dimensional pattern.

FIG. 1 is a block diagram illustrating an electronic system that includes a redundant array of inexpensive disks (RAID) storage system in accordance with at least some example embodiments of the inventive concepts. An electronic system 1000 may include a host 1100 and a RAID storage system 1200.

The host 1100 may provide a command CMD to the storage system 1200. The host 1100 may exchange data DAT with the RAID storage system 1200. The host 1100 may receive a response RSP corresponding to the command CML) from the RAID storage system 1200.

For example, when the data DAT includes write data, the host 1100 may provide the RAID storage system 1200 with the command CMD including a write command and the data DAT including the write data. For example, when the data DAT includes ead data, the host 1100 may provide the command CMD including a read command to the RAID storage system 1200, and may receive the data DAT including the read data from the RAID storage system 1200. Accordingly, the host 1100 may provide a storage service to a user.

For example, the host 1100 may be implemented to include one or more processor cores. For example, the host 1100 may include an application processor. A processor included in the host 1100 may be, for example, a special-purposed processor. The host 1100 may be a processor itself, or may be an electronic device or system including a processor.

The RAID storage system 1200 may include a RAID controller 1210 and one or more storage devices 1230. The RAID controller 1210 may manage an input/output of data for the RAID storage system 1200. Input/output of data (i.e., data input and/or output operations) may also be referred to herein as data handling operations. Under a control of the RAID controller 1210, the data DAT stored in the storage devices 1230 may be output to the host 1100 or the data DAT provided from the host 1100 may be stored in the storage devices 1230.

The storage devices 1230 may include one or more nonvolatile memories and a device controller. Each of the nonvolatile memories may include a memory region for storing the data DAT provided from the host 1100. For example, when each of the nonvolatile memories includes a NAND-type flash memory, each of the nonvolatile memories may include a memory cell array formed along a plurality of word lines and a plurality of bit lines.

However, the above example is not intended to limit at least some example embodiments of the inventive concepts. Each nonvolatile memory may include at least one of various types of nonvolatile memories, such as a phase-change random access memory (PRAM), a magnetic-resistive RAM (MRAM), resistive RAM (ReRAM), a ferro-electric RAM (FRAM), and/or the like. A configuration of each nonvolatile memory may be variously changed or modified.

The device controller of the storage devices 1230 may control the overall operations of the storage devices 1230. The device controller may control the nonvolatile memories. The device controller may communicate with the RAID controller 1210. Under a control of the device controller, data stored in the nonvolatile memories may be provided to the host 1100 through the RAID controller 1210 or data of the host 1100 may be stored in the nonvolatile memories through the RAID controller 1210.

According to at least some example embodiments of the inventive concepts, the electronic system 1000 may be implemented by one electronic device. The electronic system 1000 may be one of various electronic devices, such as home appliances, a computer, a tablet, a notebook, a smart phone, a wearable device, and/or the like.

According to at least some example embodiments of the inventive concepts, components of the electronic system 1000 may be embodied separately from each other. For example, the host 1100 may be embodied in a single computing device, and the RAID storage system 1200 may be embodied in a. separate storage device from the host 1100. At least some example embodiments of the inventive concepts may be variously changed or modified.

According to at least some example embodiments of the inventive concepts, the RAID controller 1210 may be provided separately from the storage devices 1230. According to at least some example embodiments of the inventive concepts, the RAID controller 1210 may be included inside the storage devices 1230, and the RAID storage system 1200 may be implemented by one storage device. Those example embodiments will be described with reference to FIGS. 18 and 19.

Figure 2:
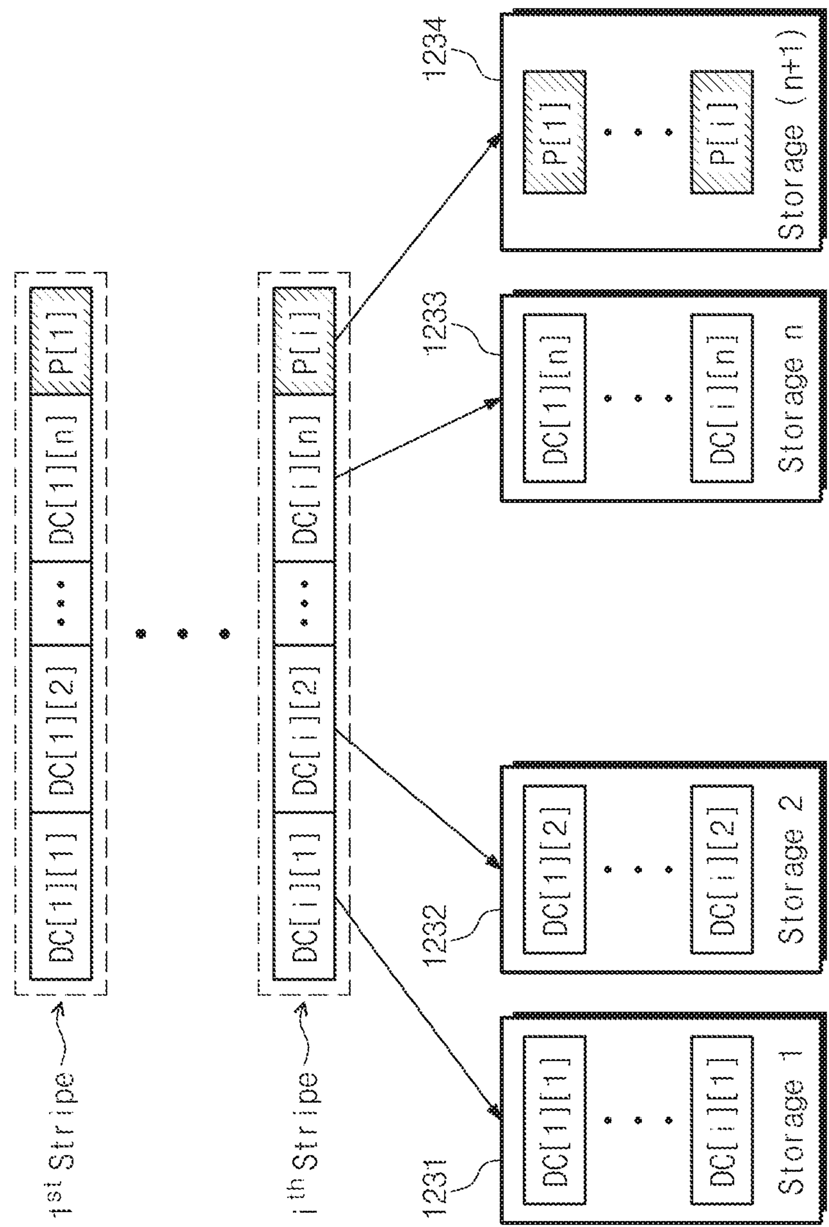
FIG. 2 is a conceptual diagram for describing a manner of storing data in the RAID storage system of FIG. 1.

FIG. 2 is a conceptual diagram for describing a manner of storing data in the RAID storage system of FIG. 1. To help better understanding, FIG. 1 will be referred together with FIG. 2.

According to at least some example embodiments of the inventive concepts, the RAID storage system 1200 may employ a RAID configuration for dividing one piece of data into multiple "data chunks" and dispersively storing the divided data chunks in multiple storages. Since it is unlikely that a plurality of storages causes problems concurrently, the RAID storage system 1200 may improve reliability of data.

The RAID configuration may be designed in various manners like RAID 0, RAID 4, RAID 5, RAID 6, or the like. To help better understanding, it will be assumed that the RAID storage system 1200 operates in the RAID 4 manner in the following descriptions. However, it would be understood that the following descriptions may be applied to a RAID configuration designed in other manner(s)

Data DAT may be transmitted between the host 1100 and the RAID storage system 1200 by a "stripe" unit. A user of the host 1100 or the RAID storage system 1200 may select a data size of a stripe. The data DAT may include one or more stripes.

One stripe may include a plurality of data chunks. Further, the stripe may include a parity that may be referred to in order to check an error of the data chunks. The data chunks and the parity may be dispersively stored in the plurality of storages.

To help better understanding, it will be assumed that i stripes are provided from the host 1100 to the RAID storage system 1200 and each of the i stripes includes n data chunks and one parity. According to this assumption, the n data chunks and the one parity included in one stripe may be dispersively stored. in (n+1) storages 1231, 1232, 1233, and 1234.

For example, the first storage 1231 may store first data chunks DC[1][1] to DC[i][1] of the i stripes. The second storage 1232 may store second data chunks DC[1][2] to DC[i][2] of the i stripes. The nth storage 1233 may store $n^{th}$ data chunks DC[1][n] to DC[i][n] of the i stripes. The $(n+1)^{th}$ storage 1234 may store parities P[1] to P[i] of the i stripes. Parities may also be referred to herein as "parity chunks."

One data chunk may have a data size corresponding to a read unit of a read operation that is performed in the storages 1231, 1232, 1233, and/or 1234. Data stored in the storages 1231, 1232, 1233, and 1234 may be read by a read unit having the same data size as a data chunk.

When such a RAID configuration is employed, even if an error occurs in one data chunk stored in one storage, the data chunk having the error may be recovered using a parity. For example, when an error occurs in the first data chunk DC[1][1] of the first stripe, the RAID controller 1210 may recover the first data chunk DC[1][1] based on the parity P[1] and the second to nth data chunks D[1][2] to D[1][n] of the first stripe. Thus, the RAID storage system 1200 may guarantee high reliability of data.

According to at least some example embodiments of the inventive concepts, each of the storages 1231, 1232, 1233, and 1234 may be implemented by one storage device. According to such example embodiments, one or more storage devices 1230 of the RAID storage system 1200 may be implemented to include a plurality of storage devices. According to at least some example embodiments of the inventive concepts, the storages 1231, 1232, 1233, and 1234 may be independent nonvolatile memories that are included in one storage device. According to such example embodiments, one or more storage devices 1230 of the RAID storage system 1200 may be implemented to include one storage device.

Figure 3:
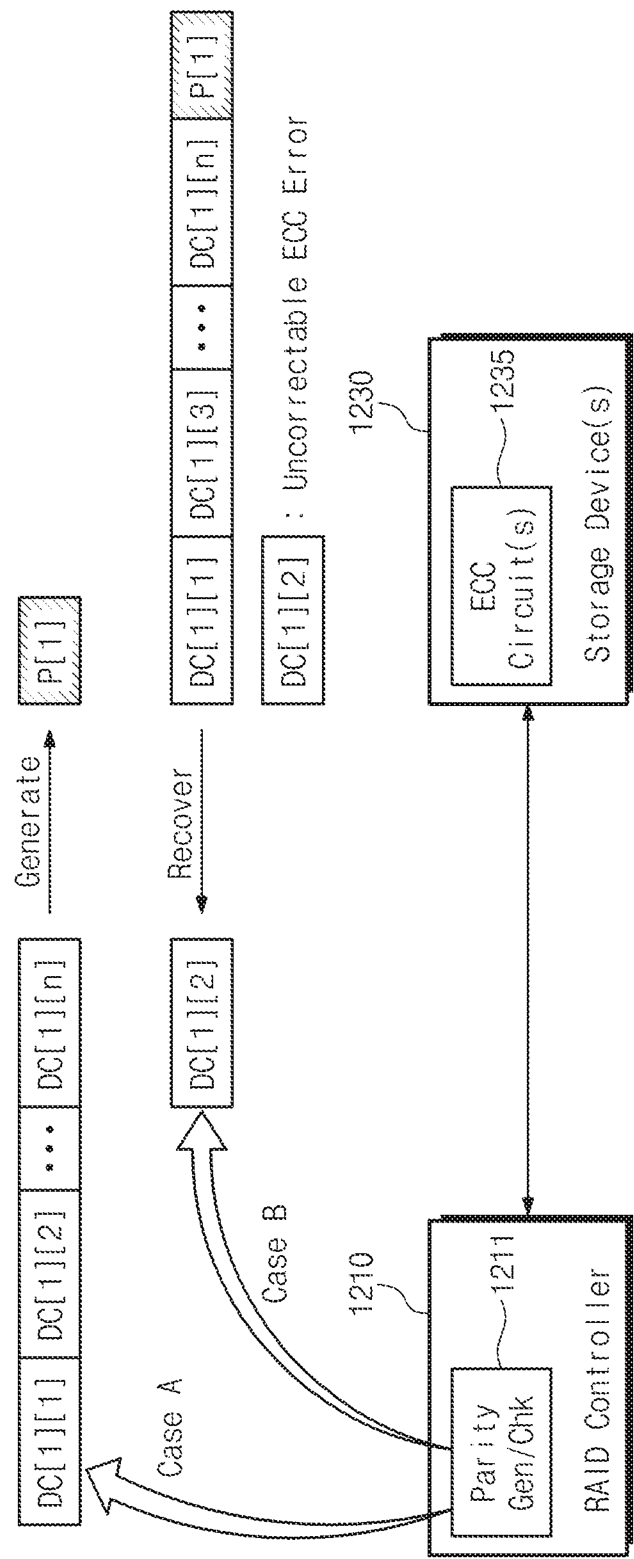
FIG. 3 is a conceptual diagram for describing a manner of processing data in the RAID storage system of FIG. 1.

FIG. 3 is a conceptual diagram for describing a manner of processing data in the RAID storage system of FIG. 1. To help better understanding, FIGS. 1 and 2 will be referred together with FIG. 3.

According to at least some example embodiments of the inventive concepts, the RAID controller 1210 may include a parity generator/checker 1211. The parity generator/checker 1211 may generate a parity to be stored together with data chunks. Further, the parity generator/checker 1211 may check an error of the data chunks with reference to the parity.

According to at least some example embodiments of the inventive concepts, one or more storage devices 1230 may include one or more error correction code (ECC) circuits 1235. When the data chunks and the parity are stored in the storage devices 1230, the ECC circuits 1235 may generate an error correction code (i.e., an ECC encoding). When the data chunks and the parity are read from the storage devices 1230, the ECC circuits 1235 may correct an ECC error with reference to the error correction code (i.e., an ECC decoding).

For example, referring to FIG. 3, a "case A" shows a case of storing the first to nth data chunks DC[1][1] to DC[1][n] included in. the first stripe in the storage devices 1230. After the RAID controller 1210 receives the first to nth data chunks DC[1][1] to DC[1][n] from the host 1100, the parity generator/checker 1211 may generate the parity P[1] corresponding to the first stripe. The first stripe including the first to nth data chunks DC[1][1] to DC[1][n] and the parity P[1] may be stored in the storage devices 1230.

Further, a "case B" shows a case of reading the data chunks of the first stripe and recovering a data chunk having an error. After the first to nth data chunks DC[1][1] to DC[1][n] are read from a memory region of the storage devices 1230, the ECC circuits 1235 may check and correct the error of the first to nth data chunks DC[1][1] to DC[1][n]. For example, the ECC circuits 1235 may perform an ECC operation based on a reed-solomon (RS) code a hamming code, a bose-chaudhuri-hocquenghem (BCH) code, and/or a low density parity check (LDPC) code, to check and correct an ECC error.

In some cases, as a trouble or problem occurs in a storage storing a specific data chunk, the data chunk may not be accurately read. In this case, an error beyond the correction capability of the ECC circuits 1235 may occur, and the ECC circuits 1235 may not correct the error of some data chunks. A data chunk having an uncorrected error may he understood to have an "uncorrectable ECC error." When data having an uncorrectable ECC error is read, the storage devices 1230 may output a read fail response.

However, even if the read fail response is output, the RAID storage system 1200 may recover a data chunk having an uncorrectable ECC error with reference to a parity. For example, when the second data chunk DC[1][2] has an uncorrectable ECC error, the RAID controller 1210 may recover the second data chunk DC[1][2] based on the first data chunk DC[1][1], the third to nth data chunks DC[1][3] to DC[1][n], and the parity P[1].

For example, when the parity P[1] is obtained by performing an exclusive OR (XOR) operation on the first to nth data chunks DC[1][1] to DC[1][n], the second data chunk DC[1][2] may be recovered by performing an XOR operation on the first data chunk DC[1][1], the third to nlh data chunks DC[1][3] to DC[1][n], and the parity P[1].

According to the operation of the RAID controller 1210, the RAID storage system 1200 may output the first stripe including the first to nth data chunks DC[1][1] to DC[1][n] to the host 1100. Thus, the RAID storage system 1200 may guarantee high reliability of data.

Figure 4:
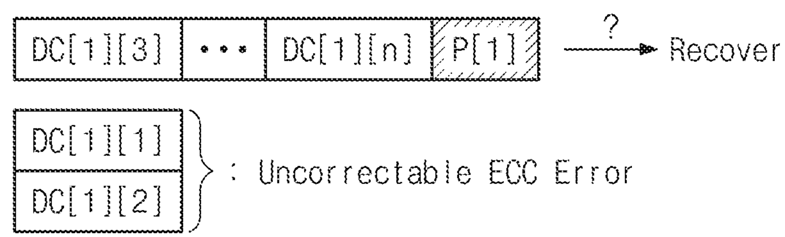
FIG. 4 is a conceptual diagram for describing a relationship between a recovery capability of the RAID storage system of FIG. 1 and the number of errors.

FIG. 4 is a conceptual diagram for describing a relationship between a recovery capability of the RAID storage system of FIG. 1 and the number of errors. To help better understanding, FIGS. 1 and 2 will be referred together with FIG. 4.

As described with reference to FIG. 3, the RAID storage system 1200 may recover a data chunk having an uncorrectable ECC error with reference to a parity. However, when one parity is used, the RAID controller 1210 may recover only one data chunk. For example, the RAID controller 1210 using only one parity may not recover two or more data chunks.

For example, when the first and second data chunks DC[1][1] and DC[1][2] have an uncorrectable ECC error, the RAID controller 1210 using one parity may not recover the two data chunks DC[1][1] and DC[1][2]. When recovering the data chunks is impossible, the RAID controller 1210 may output a read fail response to the host 1100.

To recover the two data chunks DC[1][1] and DC[1][2], two or more parities may be used or an ECC circuit having higher correction capability may be employed. However, in this case, changing a design of the RAID storage system 1200 may he required and the overhead of the RAID storage 1200 may increase.

However, At least some example embodiments of the inventive concepts may he configured not to greatly increase the overhead of the RAID storage system 1200 without additional parity. The RAID controller 1210 according to at least some example embodiments of the inventive concepts may recover a data chunk having an uncorrectable ECC error, based on an ECC result obtained by an ECC operation of the ECC circuit. Thus, the RAID storage system 1200 may guarantee much higher reliability of data.

Figure 5:
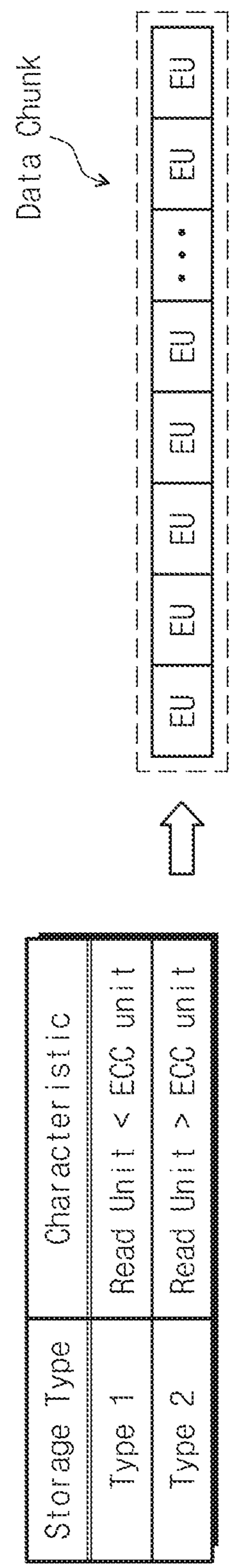
FIG. 5 is a conceptual diagram for describing a constitution of a data chunk being processed in the RAID storage system of FIG. 1.

FIG. 5 is a conceptual diagram for describing a constitution of a data chunk being processed in the RAID storage system of FIG. 1. To help better understanding, FIG. 1 will be referred together with FIG. 5.

For example, a storage device included in one or more storage devices 1230 may be classified as one of two types depending on its characteristic. In a storage device of the first type, an ECC unit having a data size for performing an ECC operation may be larger than a read unit having a data size for performing a read operation. On the other hand, in a storage device of the second type, an ECC unit may be smaller than a read unit.

For example, the storage device of the first type may include a hard disk drive (HDD). In the HDD, a read operation may be performed by a sector unit. One sector may have very small data size. Thus, an ECC unit may have a data size larger than the read unit (i.e., a sector unit) in the HDD.

For example, the storage device of the second type may include a solid state drive (SSD). In the SSD, a read operation may be performed by a page unit or a multi-page unit. To improve performance of the read operation, one page may have a relatively large data size. Accordingly, the read unit (i.e., a page unit) may have a data size larger than an ECC unit in the SSD.

As described with reference to FIG. 2, in the RAID storage system 1200, one data chunk may have a data size corresponding to a read unit. Thus, in the storage device of the second type, one data chunk may include a plurality of ECC unit data EUs (which may also be referred to as "ECC data units EUs"). The ECC unit data EU may be data having a data size of an ECC unit for performing an ECC operation.

At least some example embodiments of the inventive concepts may be employed in the storage device of the second type (e.g., SSD). However, at least some example embodiments of the inventive concepts are not limited to the SSD, and may be employed in all kinds of storage devices of the second type to recover a data chunk that includes a plurality of ECC unit data EUs and has an uncorrectable ECC error.

Figure 6:
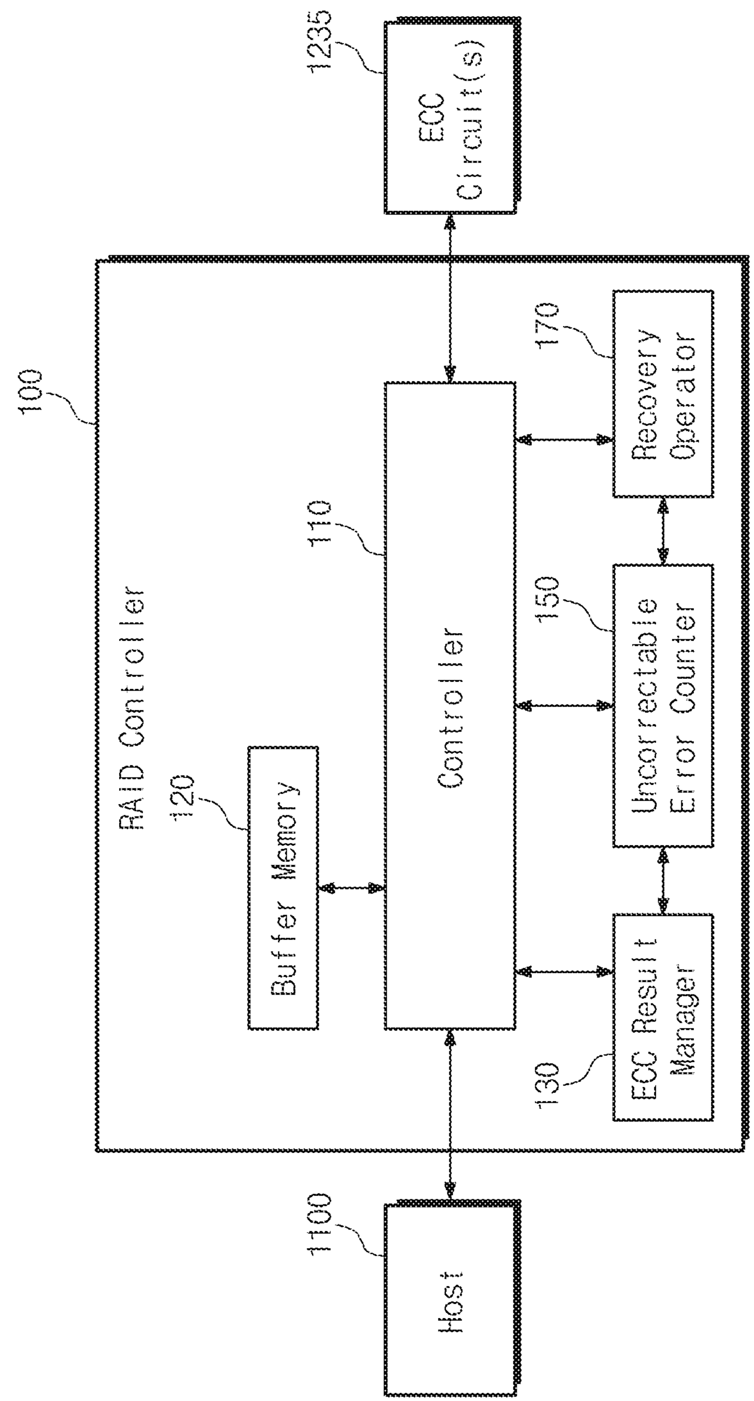
FIG. 6 is a block diagram illustrating a RAID controller in accordance with at least some example embodiments of the inventive concepts.

FIG. 6 is a block diagram illustrating a RAID controller in accordance with at least some example embodiments of the inventive concepts. A RAID controller 100 may include a controller 110, a buffer memory 120, an ECC result manager 130, an uncorrectable error counter 150, and a recovery operator 170. For example, the RAID controller 1210 of FIG. 1 may include the RAID controller 100 of FIG. 6. To help better understanding, FIG. 1 will be referred together with FIG. 6.

The controller 110 may process various arithmetic operations and/or logical operations being used in an operation of the RAID controller 100. To this end, the controller 110 may include one or more processors and/or processor cores. For example, the controller 110 may include a special-purposed logic circuit, such as field programmable gate arrays (FPGA), application specific integrated chips (ASICs), and/or the like.

The buffer memory 120 may store data being used in an operation of the RAID controller 100. For example, the buffer memory 120 may store data processed or to be processed by the controller 110. The buffer memory 120 may include a volatile memory such as a static RAM (SRAM), a dynamic RAM (DRAM), a synchronous DRAM (SDRAM), and/or the like, and/or a nonvolatile memory such as a flash memory, a PRAM, a MRAM, a ReRAM, a FRAM, and/or the like.

The ECC result manager 130 may manage information of "ECC result indicators." The ECC result indicators may indicate respectively whether a plurality of ECC unit data included in a plurality of data chunks that is dispersively stored in the storage devices 1230 has an uncorrectable ECC error. The ECC result indicator will be described in further detail with reference to FIG. 7.

The ECC circuits 1235 may perform an ECC operation (more specifically, an ECC decoding operation) on a plurality of data chunks (more specifically, a plurality of ECC unit data included in each of the plurality of data chunks) read from the storage devices 1230. Thus, the ECC circuits 1235 may check whether there is an ECC error in ECC unit data, and may correct the ECC error. Some ECC unit data may have an uncorrectable ECC error, as described above.

The ECC circuits 1235 may output results of the ECC decoding operation. The RAID controller 100 may receive the results output from the ECC circuits 1235. For example, when a data chunk that includes one or more ECC unit data having an uncorrectable ECC error is read, the RAID controller 100 may generate ECC result indicators based on the results of the ECC decoding operation.

According to at least some example embodiments of the inventive concepts, the controller 110 may generate ECC result indicators based on the results output from the ECC circuits 1235. Further, the ECC result manager 130 may include a memory region to store the ECC result indicators generated by the controller 110. According to at least some example embodiments of the inventive concepts, the ECC result manager 130 may be implemented as a hardware circuit specifically configured to perform operations described herein as being performed by the ECC result manager 130, implemented by a processor executing program instructions corresponding to operations described herein as being performed by the ECC result manager 130, or implemented as a combination of the above-referenced hardware circuit and processor executing program instructions. The ECC result manager 130 may generate and store the ECC result indicators by itself.

According to at least some example embodiments of the inventive concepts, the ECC result manager 130 may be implemented by the controller 110 such that some or all of functions of the ECC result manager 130 are performed by the controller 110. According to at least some example embodiments of the inventive concepts, the ECC result manager 130 may share the buffer memory 120 as a memory region.

As described with reference to FIG. 5, according to at least some example embodiments of the inventive concepts, one data chunk may include a plurality of ECC unit data. Thus, for one data chunk, a plurality of ECC result indicators respectively corresponding to the plurality of ECC unit data may be generated. Some of the ECC result indicators may indicate an uncorrectable ECC error, and some other ECC result indicators may indicate that there is no ECC error in corresponding ECC unit data or the ECC error is corrected.

The uncorrectable error counter 150 may calculate the number of ECC result indicators indicating an uncorrectable ECC error. According to at least some example embodiments of the inventive concepts, the uncorrectable error counter 150 may calculate the number of ECC result indicators indicating an uncorrectable ECC error among ECC result indicators that correspond to ECC unit data having the same order in each of a plurality of data chunks included in one stripe. An order of ECC unit data and an operation of the uncorrectable error counter 150 will be described in further detail with reference to FIG. 8.

According to at least some example embodiments of the inventive concepts, the uncorrectable error counter 150 may he implemented in a hardware circuit. For example, the uncorrectable error counter 150 may be implemented in a hardware circuit including a logical OR gate, an adder, or any logic circuit similar thereto. The uncorrectable error counter 150 may be implemented by a processor executing program instructions corresponding to operations described herein as being performed by the uncorrectable error counter 150, or implemented as a combination of the above-referenced hardware circuit and processor executing program instructions. According to at least some example embodiments of the inventive concepts, the uncorrectable error counter 150 may calculate the number of uncorrectable ECC errors. According to at least some example embodiments of the inventive concepts, the uncorrectable error counter 150 may be implemented by the controller 110 such that some or all of functions of the uncorrectable error counter 150 may be performed by the controller 110.

The recovery operator 170 may recover ECC unit data having an uncorrectable ECC error. For example, when the number of ECC result indicators indicating an uncorrectable ECC error does not exceed a reference value, the recovery operator 170 may recover the ECC unit data having an uncorrectable ECC error based on successfully read ECC unit data and a parity.

According to at least some example embodiments of the inventive concepts, the recovery operator 170 may recover, based on successfully read ECC unit data among ECC unit data having the same order in each of a plurality of data chunks and a parity having a corresponding order, ECC unit data having an uncorrectable ECC error in the corresponding order. An operation of the recovery operator 170 and recovering ECC unit data will be described in further detail with reference to FIG. 8.

According to at least some example embodiments of the inventive concepts, the recovery operator 170 may be implemented in a hardware circuit. For example, the recovery operator 170 may be implemented in a hardware circuit including an XOR gate or any logic circuit similar thereto. According to at least some example embodiments of the inventive concepts, the recovery operator 170 may be implemented by a processor executing program instructions corresponding to operations described herein as being performed by the recovery operator 170, or implemented as a combination of the above-referenced hardware circuit and processor executing program instructions. According to at least some example embodiments of the inventive concepts, the recovery operator 170 may be implemented by the controller 110 such that some or all of functions of the recovery operator 170 may be included in the controller 110.

According to at least some example embodiments of the inventive concepts, a calculation operation of the uncorrectable error counter 150 and a recovery operation of the recovery operator 170 may be performed according to an "order of ECC unit data." When a data size of a read unit (that is, a data size of a data chunk) is larger than an ECC unit, the RAID controller 100 may perform a recovery operation by a ECC unit with reference to a parity. The RAID controller 100 may output a stripe including the recovered ECC unit data to the host 1100.

Figure 7:
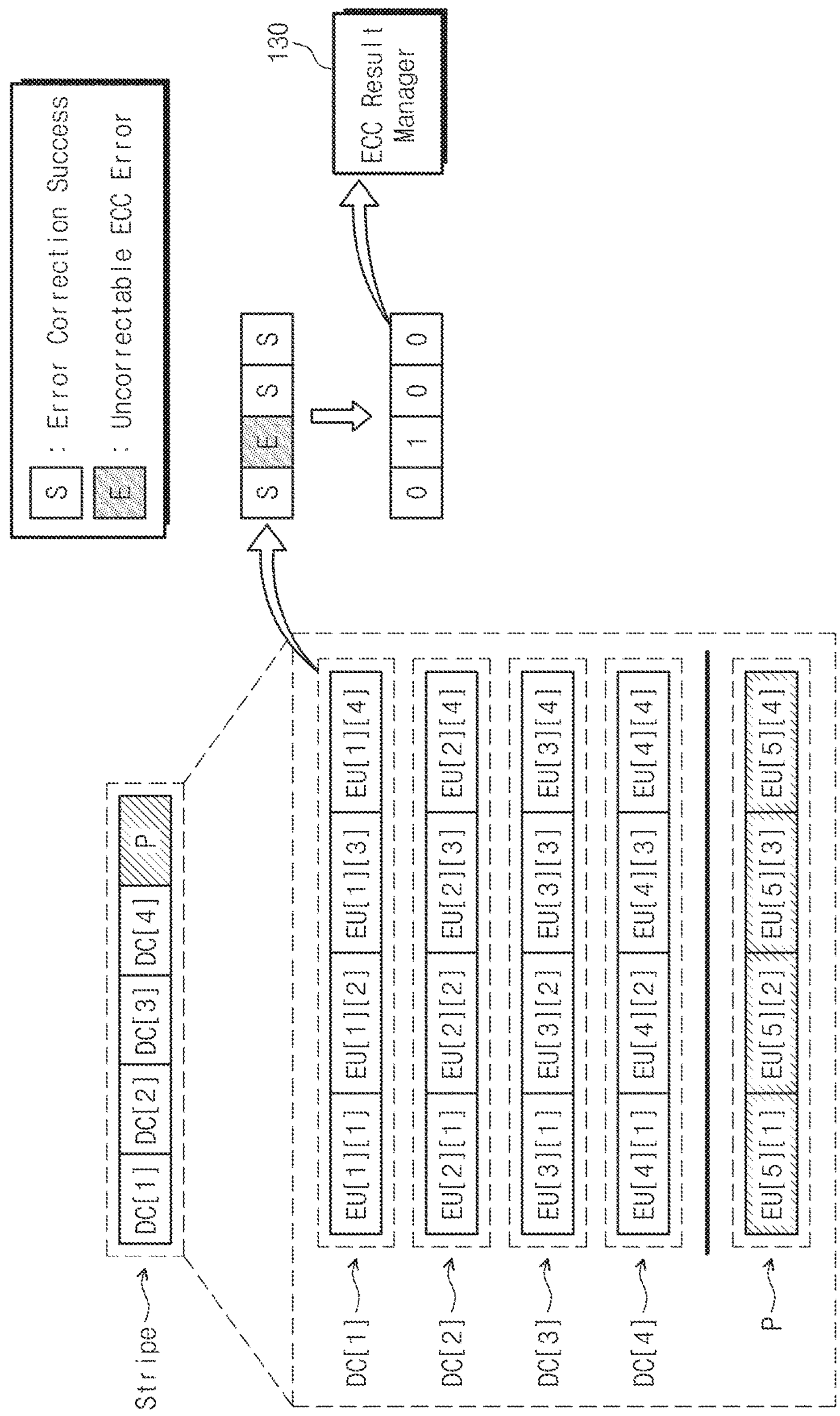
FIG. 7 is a conceptual diagram for describing an example of a stripe, a data chunk, and ECC unit data being processed in the RAID storage system of FIG. 1.

FIG. 7 is a conceptual diagram for describing an example of a stripe, a data chunk, and ECC unit data being processed in the RAID storage system of FIG. 1. To help better understanding, FIGS. 1 and 6 will be referred together with FIG. 7.

As described with reference to FIG. 2, data may be transmitted between the host 1100 and the RAID storage system 1200 by a stripe unit. To help better understanding, an example about one stripe will be described.

One stripe may include a plurality of data chunks and a parity that are dispersively tored in one or more storage devices 1230. For example, one stripe may include four data chunks DC[1] to DC[4] and one parity P. The data chunks DC[1] to DC[4] and the parity P may be dispersively stored in the storage devices 1230.

One data chunk may have a data size corresponding to a read unit of a read operation being performed in the storage devices 1230. According to at least some example embodiments of the inventive concepts, a read unit may be larger than an ECC unit having a data size for performing an ECC operation. Thus, one data chunk may include a plurality of ECC unit data of which each has a data size of an ECC unit.

For example, the first data chunk DC[1] may include first to fourth ECC unit data. EU[1][1] to EU[1][4]. Each of the second to fourth data. chunks DC[2] to DC[4] may also include four ECC unit data, and redundant descriptions associated with the second to fourth data. chunks DC[2] to DC[4] will be omitted below for brevity.

The parity P may be generated to correspond to the data chunks DC[1] to DC[4]. Thus, the parity P may also include four ECC unit data EU[5][1] to EU[5][4]. For example, first ECC unit data EU[5][1] of the parity P may be generated to correspond to first ECC unit data EU[1][1], EU[2][1], EU[3][1], and EU[4][1] of the data chunks C[i] to DC[4]. For brevity, redundant descriptions associated with the second to fourth ECC unit data EU[5][2] to EU[5][4] of the parity P will be omitted below.

As described above, when one data chunk includes ECC unit data having an uncorrectable ECC error, the data chunk may be recovered with reference to the parity P. According to at least some example embodiments of the inventive concepts, recovering the data chunk may be performed by an ECC unit. For example, when the first ECC unit data EU[1][1] of the first data chunk DC[1] has an uncorrectable ECC error, the first ECC unit data EU[1][1] may be recovered based on the first ECC unit data EU[2][1], EU[3][1], and EU[4][1] of the second to fourth data chunks DC[2] to DC[4] and the first ECC unit data EU[5][1] of the parity P. Such a recovery operation will be described in further detail with reference to FIG. 8.

For example, one or more ECC circuits 1235 may perform an ECC decoding operation on ECC unit data EU[1][1] to EU[4][4] included in the data chunks DC[1] to DC[4] read from the storage devices 1230. Therefore, the ECC circuits 1235 may check whether there is an ECC error in each of the ECC unit data EU[1][1] to EU[4][4], and may correct the ECC error. Some ECC unit data may have an uncorrectable ECC error.

For example, the first ECC unit data EU[1][1], the third ECC unit data EU[1][3], and the fourth ECC unit data EU[1][4] of the first data chunk DC[1] may not have an ECC error or the checked ECC error may be successfully corrected (it is represented by "S' in FIG. 7). On the other hand, the second ECC unit data EU[1][2] of the first data chunk DC[1] may have an uncorrectable ECC error (it is represented by "E" in FIG. 7).

As described with reference to FIG. 6, the ECC result manager 130 may manage information of ECC result indicators. For example, the ECC result manager 130 may manage information of ECC result indicators based on results of ECC decoding operations of the ECC circuits 1235.

For example, an ECC result indicator indicating an uncorrectable ECC error may have a value of "1", and an ECC result indicator indicating that there is no ECC error or the checked ECC error is corrected may have a value of "0." However, at least some ex e embodiments of the inventive concepts are not limited thereto. The value of the ECC result indicator may be variously changed or modified to identify an uncorrectable ECC error. The ECC result indicator may be configured to have a character or multiple numeric values. For brevity, it will be described below that the ECC result indicator has a value of "1" or "0."

After the ECC result indicators are generated by the controller 110 or the ECC result manager 130, the ECC result indicators may be stored in the buffer memory 120 or the ECC result manager 130. For example, the ECC result manager 130 or the buffer memory 120 may store ECC result indicators having a value of vector "(0, 1, 0, 0) with respect to the first data chunk DC[1].

In such a manner, the ECC result manager 130 may manage ECC result indicators respectively corresponding to the ECC unit data EU[1][1] to EU[1][4] included in the data chunks DC[1] to DC[4]. These ECC result indicators may be referred to in order to recover ECC unit data having an uncorrectable ECC error.

In the above descriptions, it has been described that one stripe includes four data. chunks DC[1] to DC[4] and one parity P, and each data chunk (and the parity P) includes four ECC unit data. However. FIG. 7 is provided to help facilitate understanding, and is not intended to limit at least some example embodiments of the inventive concepts. The number of data chunks, the number of ECC unit data, and the number of parities may be variously changed or modified.

Figure 8:
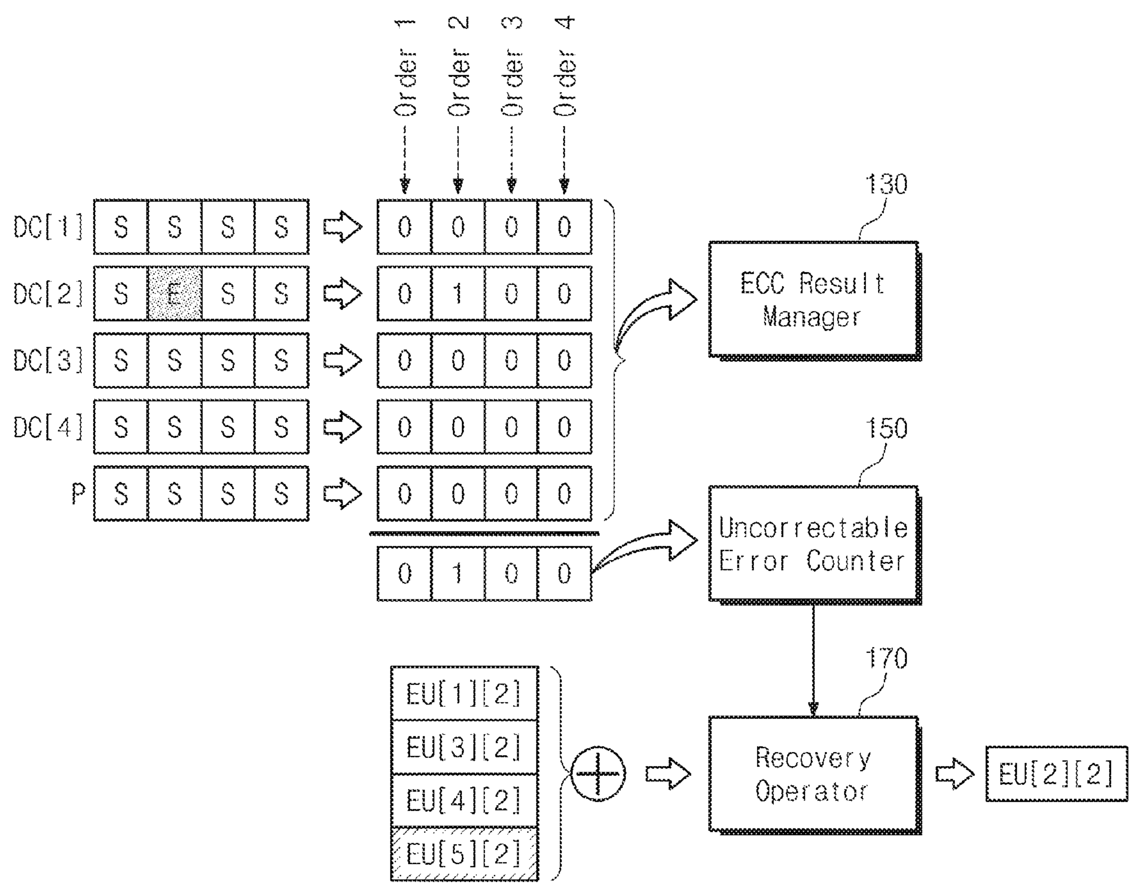
FIG. 8 is a conceptual diagram for describing a process of recovering an uncorrectable error in the RAID controller of FIG. 6.

FIG. 8 is a conceptual diagram for describing a process of recovering an uncorrectable error in the RAID controller of FIG. 6. To help facilitate understanding, FIGS. 6 and 7 will. be referred together with FIG. 8.

FIG. 8 illustrates an example of results of the ECC decoding operation performed on the data chunks DC[1] to DC[4] and corresponding ECC result indicators. For example, in FIG. 8, the second ECC unit data EU[2][2] of the second data chunk DC[2] may have an uncorrectable ECC error. Meanwhile, other ECC unit data may not have an ECC error or an ECC error thereof may be successfully corrected (that is, other ECC unit data may be successfully read). The parity P may not have an ECC error.

In the example of FIG. 8, an ECC result indicator corresponding to the second ECC unit data EU[2][2] of the second data chunk DC[2] may have a value of "1." Meanwhile, ECC result indicators corresponding to other ECC unit data may have a value of "0." The ECC result manager 130 may manage values of these ECC result indicators.

For example, one data chunk (and the parity P) may include four ECC unit data. The data chunks DC[1] to DC[4] and the parity P may have the same number of ECC unit data.

ECC unit data of the parity P may be generated to correspond to ECC unit data having the "same order" in each of the data chunks DC[1] to DC[4]. For example, the first ECC unit data EU[1][1], EU[2][1], EU[3][1], and EU[4][1] of the data chunks DC[1] to DC[4] may have the first order. The first ECC unit data EU[5][1] of the parity P may he generated to correspond to the first ECC unit data EU[1][1], EU[2][1], EU[3][1], and EU[4][1] having the first order. The second through fourth ECC unit data EU[5][2] EU[5][4] of the parity P may be generated to in a similar manner with respect to ECC unit data of the second through fourth orders. For brevity, redundant descriptions associated with second to fourth orders will be omitted below.

The uncorrectable error counter 150 may calculate the number of ECC result indicators indicating an uncorrectable ECC error in each order. For example, since all ECC result indicators of the first order have a value of "0", the uncorrectable error counter 150 may calculate a. value of "0" with respect to the first order. However, since one ECC result indicator among ECC result indicators of the second ECC order (that is, an ECC result indicator corresponding to the second ECC unit data EU[2][2] of the second data chunk DC[2]) has a value of "1", the uncorrectable error counter 150 may calculate a value of "1" with respect to the second order. In such a manner, the uncorrectable error counter 150 may calculate a value of "0" with respect to the third and fourth orders.

The recovery operator 170 may recover ECC unit data having an uncorrectable ECC error in each order. More specifically, when the number of ECC result indicators calculated by the uncorrectable error counter 150 does not exceed a reference value, the recovery operator 170 may perform a recovery operation. The reference value may be selected considering a recovery capability of the RAID controller 100. For example, when one parity P is used, since one data chunk may be recovered (refer to FIGS. 3 and 4), the reference value may he selected as "1."

It may be understood that there is no uncorrectable ECC error in the first, third and fourth orders. Thus, the recovery operator 170 may not perform a recovery operation with respect to the first, third and fourth orders. On the other hand, it may be understood that one uncorrectable ECC error occurs in the second. order. Since the number of uncorrectable ECC errors in the second order does not exceed the reference value "1", the recovery operator 170 may perform a recovery operation with respect to the second order.

The recovery operator 170 may recover the second ECC unit data EU[2][2] of the second data chunk DC[2] having an uncorrectable ECC error. More specifically, the recovery operator 170 may recover the second ECC unit data EU[2][2] of the second data chunk DC[2], based on ECC unit data EU[1][2], EU[3][2], and EU[4][2] that are successfully read from among ECC unit data EU[1][2], EU[2][2], EU[3][2], and EU[4][2] having the second order in each of the data chunk DC[1] to DC[4], and the second ECC unit data EU[5][2] of the parity P having the second order.

For example, when the parity P is obtained by performing an XOR operation on the data chunks DC[1] to DC[4], the recovery operator 170 may perform an XOR operation on the successfully read ECC unit data EU[1][2], EU[3][2], and EU[4][2] and the second ECC unit data EU[5][2] of the parity P, to recover the second ECC unit data EU[2][2] of the second data chunk DC[2].

A recovery operation of the recovery operator 170 may be performed by an ECC unit in each order. According to at least some example embodiments of the inventive concepts, such a recovery operation would be possible because a data size of a read unit is larger than a data size of a ECC unit.

To perform a recovery operation, the buffer memory 120 may be used. According to at least some example embodiments of the inventive concepts, the buffer memory 120 may store only ECC unit data EU[1][2], EU[2][2], EU[3][2], EU[4][2], and EU[5][2] having the second order, instead of storing all the data chunks DC[1] to DC[4] and the parity P, during the recovery operation. The buffer memory 120 may not store ECC unit data that is not used in the recovery operation. The recovery operation may be performed using only ECC unit data EU[1][2], EU[2][2], EU[3][2], EU[4][2], and EU[5][2] having the second order. Accordingly, using efficiency and an operation speed of the buffer memory 120 may be improved.

Figure 9:
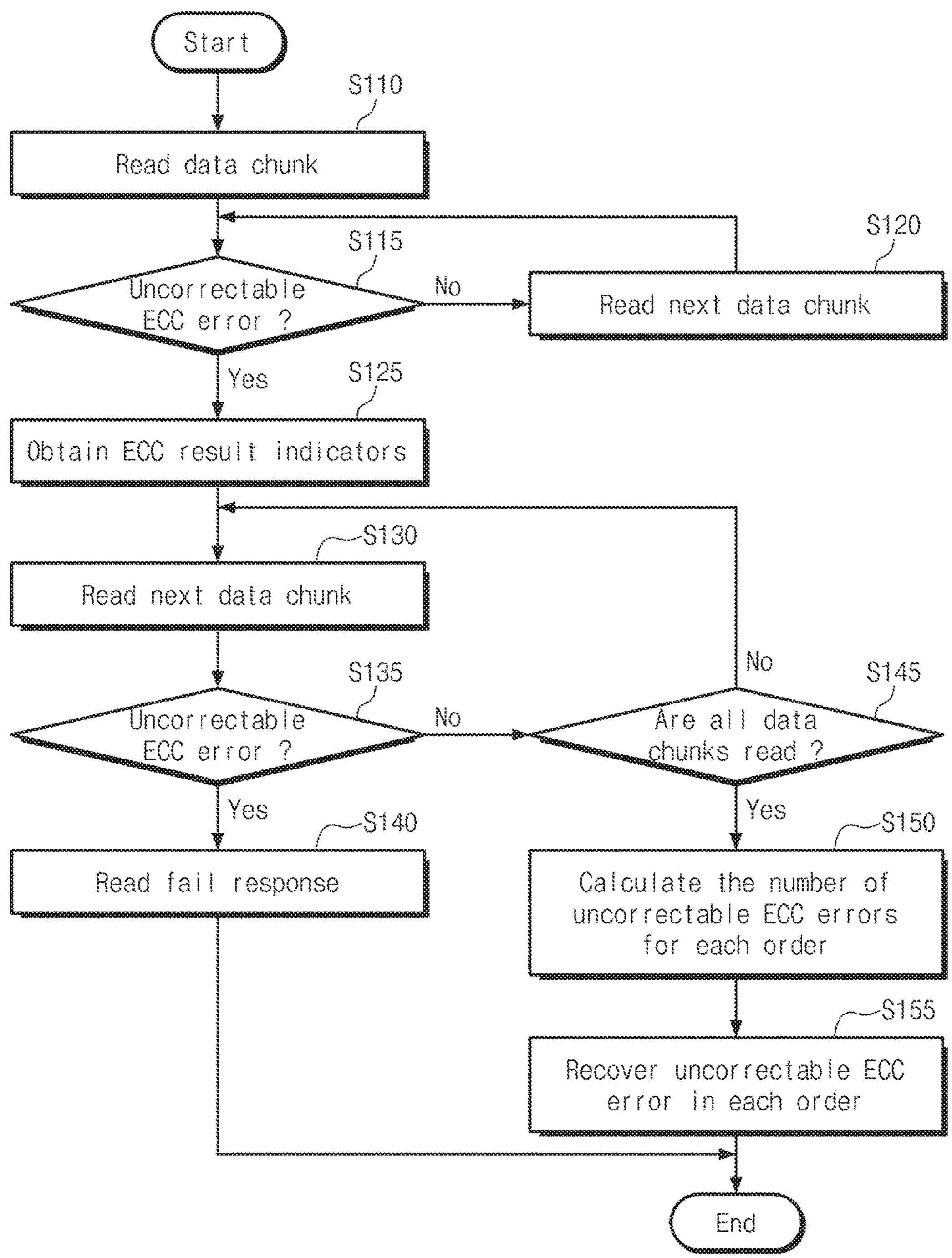
FIG. 9 is a flowchart describing a process of recovering an uncorrectable error in the RAID controller of FIG. 6 according to at least some example embodiments of the inventive concepts.

FIG. 9 is a flowchart describing a process of recovering an uncorrectable error in the RAID controller of FIG. 6 according to at least some example embodiments of the inventive concepts. To help facilitate understanding, FIGS. 1 and 6 will be referred together with FIG. 9. Further, a process of FIG. 9 will be described based on the example of FIG. 8.

in an operation S110, one data chunk (e.g., a first data chunk DC[1]) may be read from the storage devices 1230. For example, the RAID controller 1210 may read one data chunk (e.g., a first data chunk DC[1.]) from the storage devices 1230. In an operation S115, the ECC circuits 1235 may check whether the first data chunk DC[1] includes ECC unit data having an uncorrectable ECC error. When the first data chunk DC[1] is successfully read (i.e., when there is no uncorrectable ECC error), in an operation S120, the next data chunk (e.g., a second data chunk DC[2]) may be read from the storage devices 1230 (e.g., by the RAID controller 1210).

In an operation S115 again, the ECC circuits 1235 may check whether the second data chunk DC[2] includes ECC unit data having an uncorrectable ECC error. For example, the second ECC unit data EU[2][2] of the second data chunk DC[2] may have an uncorrectable ECC error. Thus, in an operation S125, the ECC result manager 130 may prepare ECC result indicators corresponding to the ECC unit data ELT[2][1] to EU[2][4] included in the second data chunk DC[2].

In an operation S130, the next data chunk (e.g., a third data chunk DC[3]) may be read from the storage device 1230 (e.g., by the RAID controller 1210). In an operation S135, the ECC circuits 1235 may check whether the third data chunk DC[3] includes ECC unit data having an uncorrectable ECC error.

Unlike the example of FIG. 8, if the third data chunk DC[3] includes ECC unit data having an uncorrectable ECC error, in an operation S140, the RAID controller 100 may output a read fail response. In the example embodiment of FIG. 9, when two or more data chunks include ECC unit data having an uncorrectable ECC error, a read fail response may be output.

On the other hand, when the third data chunk DC[3] is successfully read like the example of FIG. 8, in an operation S145, the controller 110 may determine whether all the data chunks are read. However, all the data have not been read yet, and the operations S130, S135 and S145 may be repeatedly performed with respect to the fourth data chunk DC[4].

After all the data chunks including the fourth data chunk DC[4] have been read, in an operation S150, the uncorrectable error counter 150 may calculate the number of ECC result indicators indicating an uncorrectable ECC error in each order. In the example embodiment of FIG. 9, since a read fail response may be output when two or more data chunks include ECC unit data having an uncorrectable ECC error (refer to the operation S140), the number of ECC result indicators calculated by the uncorrectable error counter 150 may not exceed the reference value.

Thus, in an operation S155, the recovery operator 170 may recover ECC unit data having an uncorrectable ECC error in each order (e.g., the second ECC unit data EU[2][2] of the second data chunk DC[2]). In the example embodiment of FIG. 9, when only one data chunk includes ECC unit data having an uncorrectable ECC error, the recovery operator 170 may recover the ECC unit data. To this end, the recovery operator 170 may perform a recovery operation with respect to an order of an ECC unit data having an uncorrectable ECC error.

Even when one data chunk includes a plurality of ECC unit data having an uncorrectable ECC error, the example embodiment of FIG. 9 may be applied. For example, when the second ECC unit data EU[2][2] and the third ECC unit data EU[2][3] of the second data chunk DC[2] have an uncorrectable ECC error, the recovery operator 170 may perform a recovery operation with respect to the second and third orders.

The example embodiment of FIG. 9 may be configured to recover an uncorrectable ECC error of one data chunk. Thus, the example embodiment of FIG. 9 may be relatively easily implemented and may be effectively managed.

Figure 10:
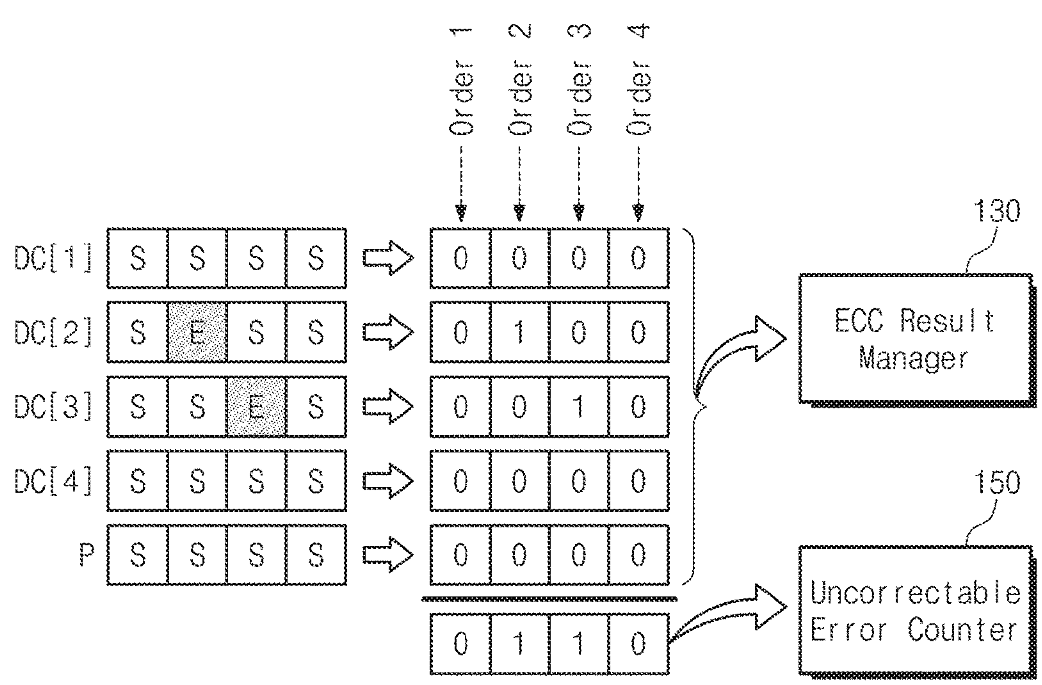
FIG. 10 is a conceptual diagram for describing a process of recovering an uncorrectable error in the RAID controller of FIG. 6.

FIG. 10 is a conceptual diagram describing a process of recovering an uncorrectable error in the RAID controller of FIG. 6. Unlike the example of FIG. 8, an example of FIG. 10 shows a case where two data chunks include ECC unit data having an uncorrectable ECC error.

In the example of FIG. 10, the ECC result manager 130 may manage an ECC result indicator having a value of “1” for the second ECC unit data EU[2][2] of the second data chunk DC[2]. The ECC result manager 130 may manage an ECC result indicator having a value of “1” for the third ECC unit data EU[3][3] of the third data chunk DC[3]. On the other hand, other ECC result indicators may have a value of “0.” In this example, the uncorrectable error counter 150 may calculate a value of “1” for the second and third orders.

However, if the process of FIG. 9 is applied to the example of FIG. 10, a read fail response may be output at the operation S140 of FIG. 9. This is because two data chunks DC[2] and DC[3] include ECC unit data having an uncorrectable ECC error in the example of FIG. 10, while the example embodiment of FIG. 9 is configured to recover an uncorrectable ECC error of one data chunk. An example embodiment for recovering an uncorrectable ECC error illustrated in the example of FIG. 10 will be described with reference to FIG. 11.

Figure 11:
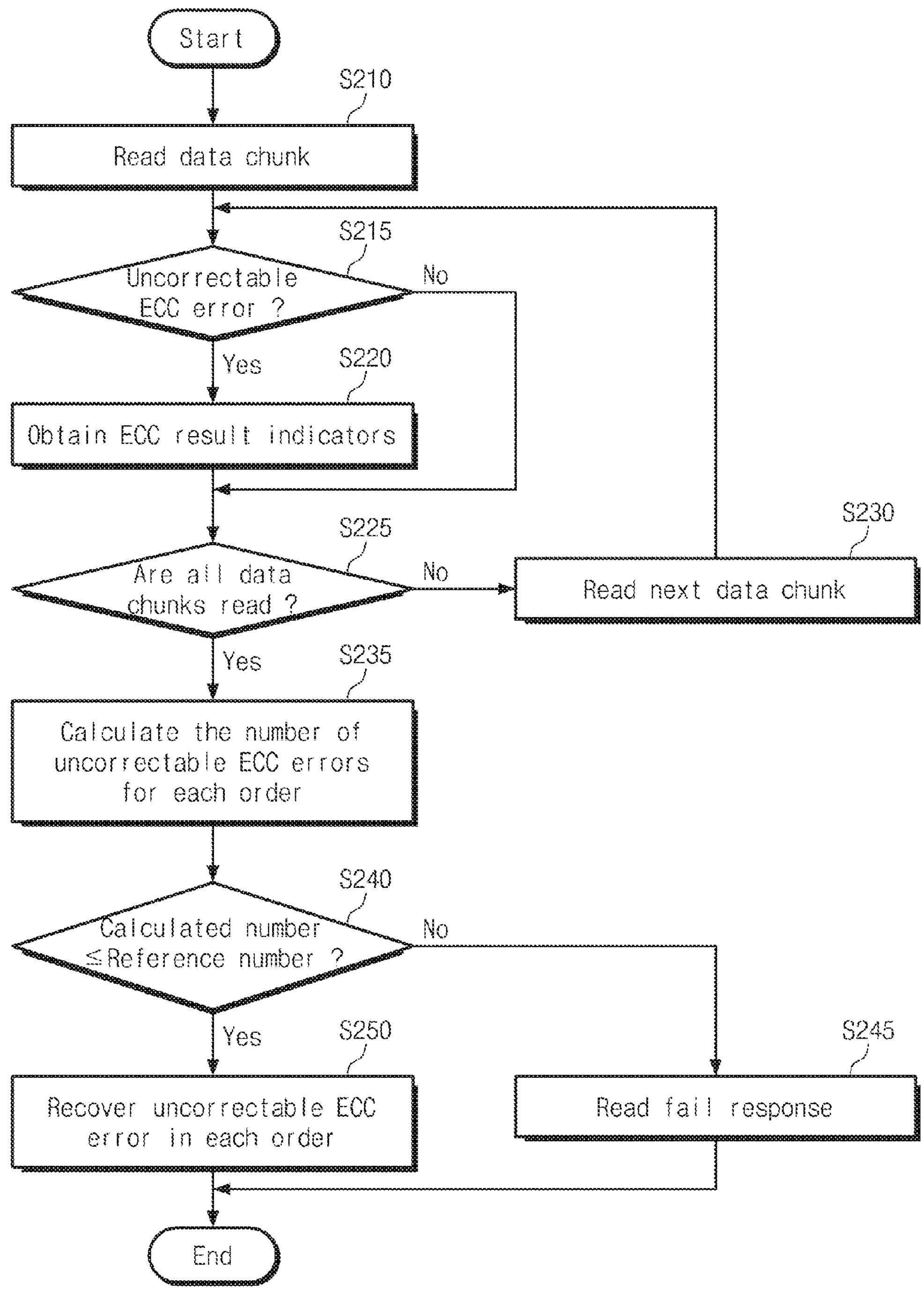
FIG. 11 is a flowchart describing a process of recovering an uncorrectable error in the RAID controller of FIG. 6 according to at least some example embodiments of the inventive concepts.

FIG. 11 is a flowchart describing a process of recovering an uncorrectable error in the RAID controller of FIG. 6 according to at least some example embodiments of the inventive concepts. To help better understanding, FIGS. 1 and 6 will be referred together with FIG. 11. Further, a process of FIG. 11 will be described based on the example of FIG. 10.

In an operation S210, one data chunk (e.g., a first data chunk DC[1]) may be read from the storage devices 1230. For example, the RAID controller 1210 may read one data chunk (e.g., a first data chunk DC[1]) from the storage devices 1230. In an operation S215, the ECC circuits 1235 may check whether the first data chunk DC[1] includes ECC unit data having an uncorrectable ECC error.

When the first data chunk DC[1] is successfully read (i.e., when there is no uncorrectable ECC error), in an operation S225, the controller 110 may determine whether all the data chunks are read. However, all the data chunks have not been read yet, and thus in an operation S230, the next data chunk (e.g., a second data chunk DC[2]) may be read from the storage devices 1230 (e.g., by the RAID controller 1210).

In the operation S215 again, the ECC circuits 1235 may check whether the second data chunk DC[2] includes ECC unit data having an uncorrectable ECC error. For example, the second ECC unit data EU[2][2] of the second data chunk DC[2] may have an uncorrectable ECC error. Thus, in an operation S220, the ECC result manager 130 may prepare ECC result indicators corresponding to the ECC unit data EU[2][1] to EU[2][4] included in the second data chunk DC[2].

In such a manner, the operations S225, S230, S215 and S220 may be repeated with respect to the third data chunk DC[3]. Further, the operations S225, S230 and S215 may be repeated with respect to the fourth data chunk DC[4]. For brevity, redundant descriptions associated with the third data chunk DC[3] and the fourth data chunk DC[4] will be omitted below.

According to at least some example embodiments of the inventive concepts, the operation S220 may not be performed with respect to a successfully read data chunk (e.g., the first data chunk DC[1] or the fourth data chunk DC[4]). According to at least some example embodiments of the inventive concepts, the operation S220 may be performed with respect to a successfully read data chunk. In such example embodiments, ECC result indicators corresponding to the successfully read data chunk may he generated to have a value of "0."

After all the data chunks are read, in an operation S235, the uncorrectable error counter 150 may calculate the number of ECC result indicators indicating an uncorrectable ECC error in each order. In the example of FIG. 10, the uncorrectable error counter 150 may calculate a value of "1" with respect to the second order and the third order. However, the uncorrectable error counter 150 may calculate a value of "0" with respect to the first order and the fourth order.

In an operation S240, the recovery operator 170 or the controller 110 may determine whether the number of uncorrectable ECC errors calculated by the uncorrectable error counter 150 exceeds a reference value of "1." According to at least some example embodiments of the inventive concepts, the reference values may indicate a maximum number of uncorrectable ECC errors for one of the orders. In some cases, unlike the example of FIG. 10, the number of uncorrectable ECC errors that occur in a specific order may exceed the reference value. In this case, in an operation S245, the RAID controller 100 may output a read fail response.

On the other hand, in the example of FIG. 10, the number of uncorrectable ECC errors calculated by the uncorrectable error counter 150 may not exceed the reference value. Thus, in an operation S250, the recovery operator 170 may recover ECC unit data having an uncorrectable ECC error in each order (e.g., the second ECC unit data. EU[2][2] of the second data chunk DC[2] and the third ECC unit data EU[3][3] of the third data chunk DC[3]).

In the operation S250, the recovery operator 170 may perform a recovery operation with respect to an order of ECC unit data having an uncorrectable ECC error. In the example of FIG. 10, the recovery operator 170 may perform a recovery operation with respect to the second order and the third order. The recovery operation will be described in further detail with reference to FIG. 12.

The illustration of FIG. 11 may be configured to recover uncorrectable ECC errors of two or more data chunks. Thus, the RAID controller 100 that operates according to the illustration of FIG. 11 may have higher recovery ability.

Figure 12:
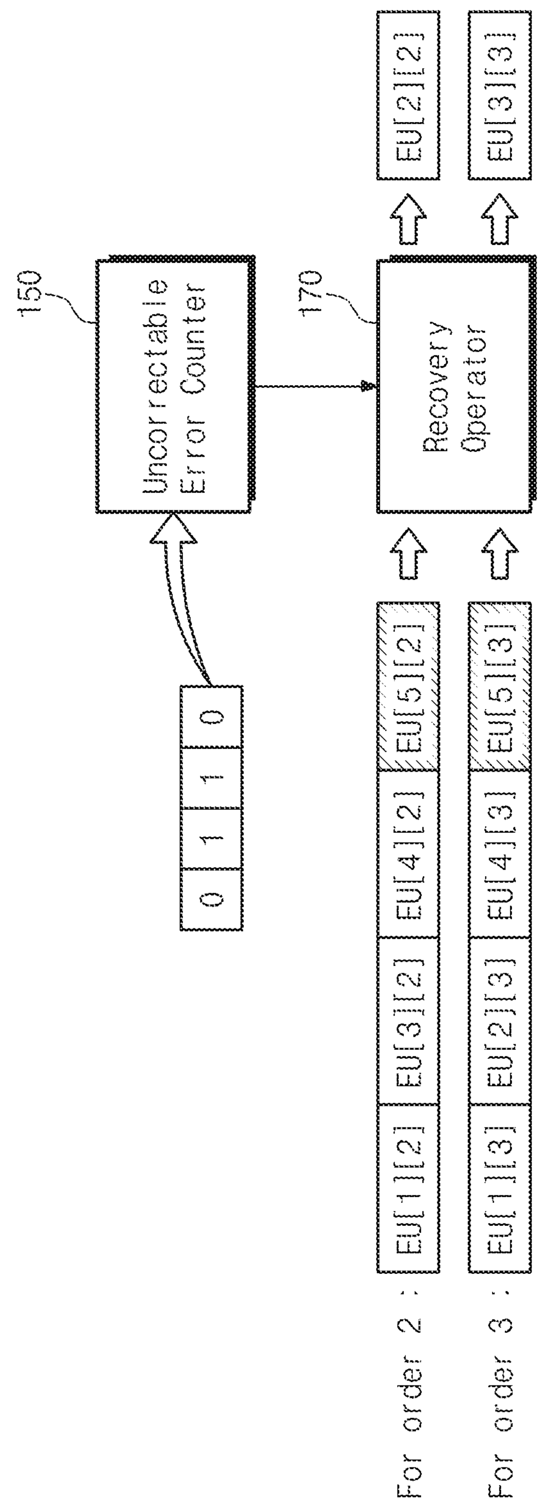
FIG. 12 is a conceptual diagram for describing a process of recovering the uncorrectable error of FIG. 10 by means of the process of FIG. 11.

FIG. 12 is a conceptual diagram for describing a process of recovering the uncorrectable error of FIG. 10 by means of the process of FIG. 11. To help better understanding, FIG. 10 will be referred together with FIG. 12.

For example, the uncorrectable error counter 150 may calculate a value of "1" with respect to the second order and the third order. Accordingly, the recovery operator 170 may perform a recovery operation with respect to the second order and the third order.

In the second order, the recovery operator 170 may recover the second ECC unit data EU[2][2] of the second data chunk DC[2]. More specifically, the recovery operator 170 may recover the second ECC unit data EU[2][2] of the second data chunk DC[2] based on the successfully read ECC unit data EU[1][2], EU[3][2], and EU[4][2] in the second order and the second ECC unit data EU[5][2] of the parity P. For example,the recovery operator 170 may perform an XOR operation on the ECC unit data EU[1][2], EU[3][2], and EU[4][2] and the second ECC unit data EU[ ][2] of the parity P, to recover the second ECC unit data EU[2][2] of the second data chunk DC[2].

In the third order, the recovery operator 170 may recover the third ECC unit data EU[3][3] of the third data chunk DC[3]. More specifically, the recovery operator 170 may recover the third ECC unit data EU[3][3] of the third data chunk DC[3] based on the successfully read ECC unit data EU[1][3], EU[2][3], and EU[4][3] in the third order and the third ECC unit data EU[5][3] of the parity P. For example, the recovery operator 170 may perform an XOR operation on the ECC unit data EU[1][3], EU[2][3], and EU[4][3] and the third ECC unit data EU[5][3] of the parity P, to recover the third ECC unit data EU[3][3] of the third data chunk DC[3].

In such a manner, two or more data chunks may be recovered regardless of the number of data chunks that include ECC unit data having an uncorrectable ECC error. However, when the number of uncorrectable ECC errors that occur in a specific order exceeds the reference value, a read fail response may be output (refer to the operation S245 of FIG. 11). Thus, to perform a recovery operation according to the example embodiment of FIG. 11, orders of ECC unit data having an uncorrectable ECC error in each of the data chunks need not to overlap.

Figure 13:
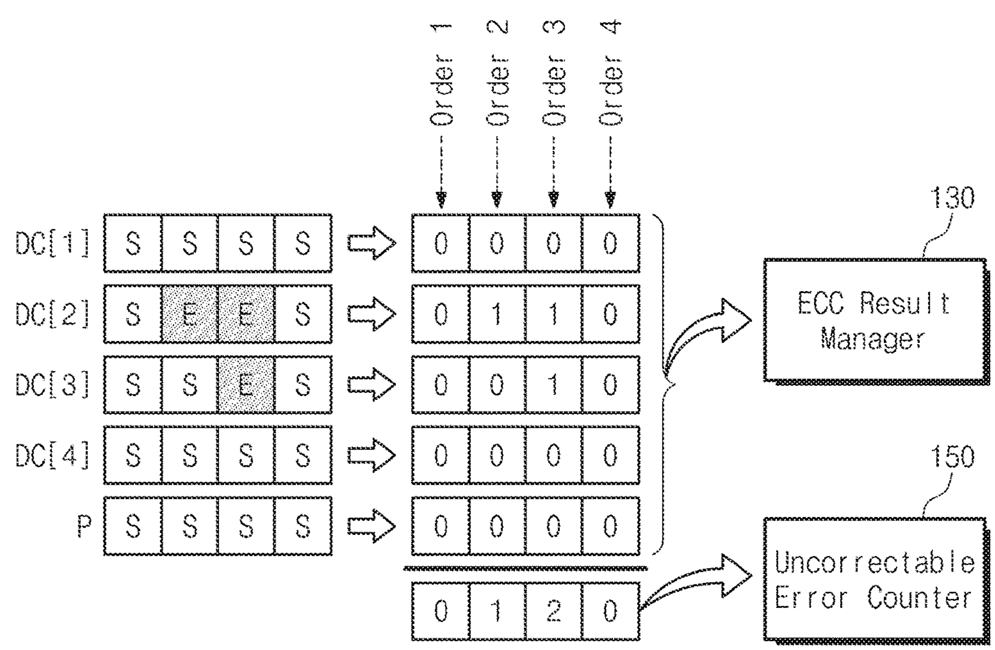
FIG. 13 is a conceptual diagram for describing a process of recovering an uncorrectable error in the RAID controller of FIG. 6.

FIG. 13 is a conceptual diagram for describing a process of recovering an uncorrectable error in the RAID controller of FIG. 6. Unlike the example of FIG. 8, an example of FIG. 13 shows a case where two data chunks include ECC unit data having an uncorrectable ECC error. Further, unlike the example of FIG. 10, the example of FIG. 13 shows a case where orders of ECC unit data having an uncorrectable ECC error overlap.

In the example of FIG. 13, the ECC result manager 130 may manage ECC result indicators having a value of "1" with respect to the second ECC unit data EU[2][2] and the third ECC unit data EU[2][3] of the second data chunk DC[2]. The ECC result manager 130 may manage an ECC result indicator having a value of "1" with respect to the third ECC unit data EU[3][3] of the third data chunk DC[3]. Meanwhile, other ECC result indicators may have a value of "0."

In this example, the uncorrectable error counter 150 may calculate a value of "1" with respect to the second order. Further, the uncorrectable error counter 150 may calculate a value of "2" with respect to the third order.

However, when the process of FIG. 11 is applied to the example of FIG. 13, a read fail response may be output in the operation of FIG. 11. This is because uncorrectable ECC errors more than the reference value "1" have been occurred in the third order of the example of FIG. 13, while the example embodiment of FIG. 11 is configured such that a recovery operation is performed if the number of uncorrectable ECC errors that occur in a single order does not exceed the reference value. An example embodiment to recover an uncorrectable ECC error shown in the example of FIG. 13 will be described with reference to FIG. 14.

Figure 14:
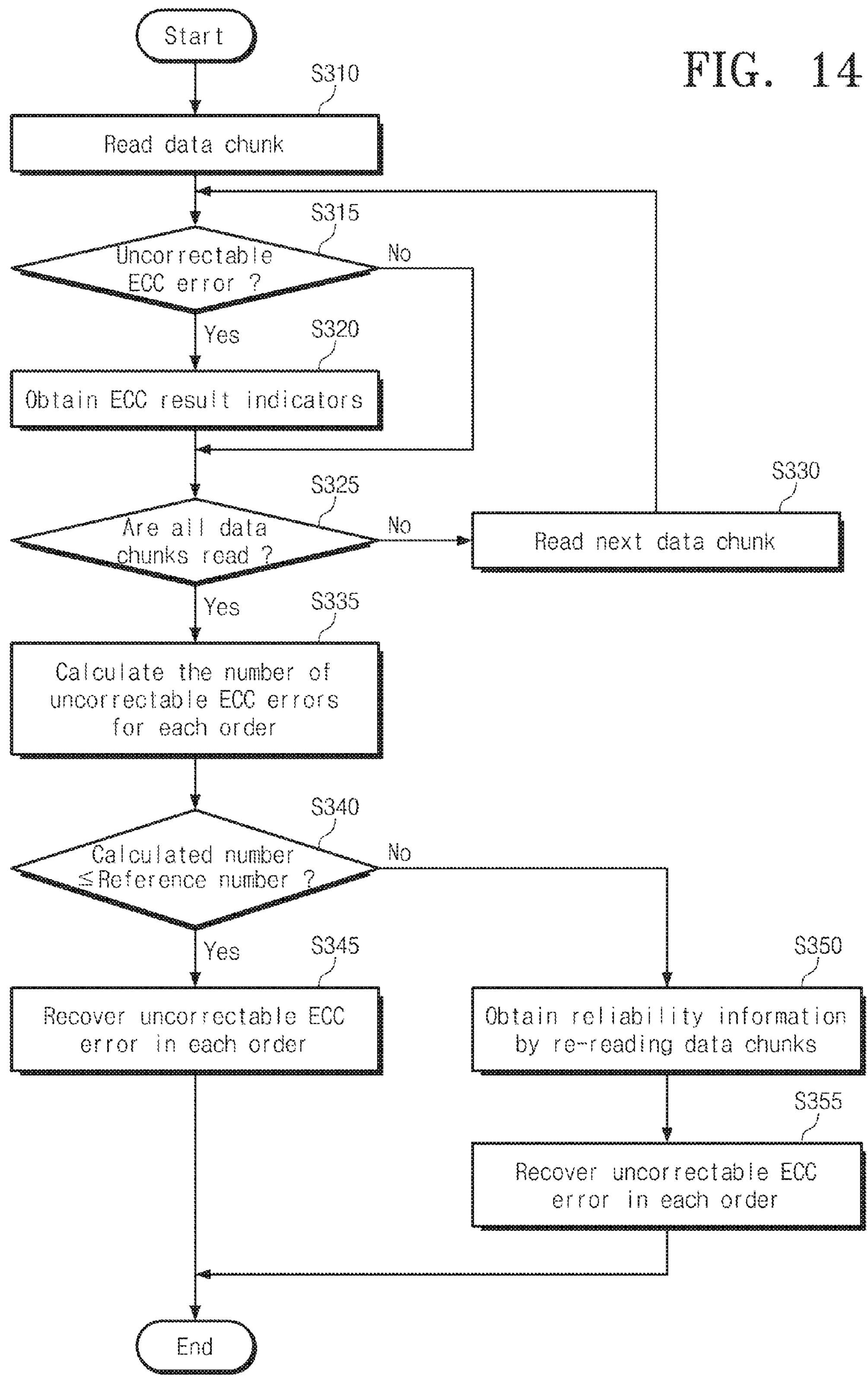
FIG. 14 is a flowchart describing a process of recovering an uncorrectable error in the RAID controller of FIG. 6 according to at least some example embodiments of the inventive concepts.

FIG. 14 is a flowchart describing a process of recovering an uncorrectable error in the RAID controller of FIG. 6 according to at least some example embodiments of the inventive concepts. To help better understanding, FIGS. 1 and 6 will be referred together with FIG. 14. A process of FIG. 14 will be described based on the example of FIG. 13.

In an operation S310, one data chunk (e.g., a first data chunk DC[1]) may be read from the storage devices 1230. For example, the RAID controller 1210 may read one data chunk (e.g., a first data chunk DC[1]) from the storage devices 1230. In an operation S315, the ECC circuits 1235 may check whether the first data chunk DC[1] includes ECC unit data having an uncorrectable ECC error.

When the first data chunk DC[1] is successfully read (i.e., when there is no uncorrectable ECC error), in an operation S325, the controller 110 may determine whether all the data chunks are read. However, all the data chunks have not been read yet, and thus in an operation S330, the next data chunk (e.g., a second data chunk DC[2]) may be read from the storage devices 1230 (e.g., by the RAID controller 1210).

In the operation S315 again, the ECC circuits 1235 may check whether the second data chunk DC[2] includes ECC unit data having an uncorrectable ECC error. For example, the second ECC unit data EU[2][2] and the third ECC unit data EU[2][3] of the second data chunk DC[2] may have an uncorrectable ECC error. Thus, in an operation S320, the ECC result manager 130 may prepare ECC result indicators corresponding to the ECC unit data EU[2][1] to EU[2][4] included in the second data chunk DC[2].

In such a manner, the operations S325, S330, S315 and S320 may be repeated with respect to the third data chunk DC[3]. Further, the operations S325, S330 and S315 may be repeated with respect to the fourth data chunk DC[4]. For brevity, redundant descriptions associated with the third data chunk DC[3] and the fourth data chunk DC[4] will be omitted below.

After all the data chunks are read, in an operation S335, the uncorrectable error counter 150 may calculate the number of ECC result indicators indicating an uncorrectable ECC error in each order. In the example of FIG. 13, the uncorrectable error counter 150 may calculate a value of "1" with respect to the second order, and may calculate a value of "2" with respect to the third order. Meanwhile, the uncorrectable error counter 150 may calculate a value of "0" with respect to the first order and the fourth order.

In an operation S340, the recovery operator 170 or the controller 110 may determine whether the number of uncorrectable ECC errors calculated by the uncorrectable error counter 150 exceeds a reference value of "1." In the second order, the number of uncorrectable ECC errors calculated by the uncorrectable error counter 150 may not exceed the reference value. Thus, in an operation S345, the recovery operator 170 may perform a recovery operation with respect to the second order, to recover the second ECC unit data EU[2][2] of the second data chunk DC[2].

However, in the third order, the number of uncorrectable ECC errors calculated by the uncorrectable error counter 150 may exceed the reference value. For example, when one parity is used, it may be difficult to recover two ECC unit data having an uncorrectable ECC error. In the example, the recovery operator 170 may not recover two ECC unit data together.

Operations S350 and S355 may be performed to recover uncorrectable ECC errors more than the reference value in a specific order (e.g., the second order). In the operation S350, the controller 110 or the recovery operator 170 may obtain "reliability information" to perform a recovery operation with reference to the third order. The reliability information may be obtained by re-reading some or all of data values of the data chunks from the storage devices 1230. For example, the reliability information may be obtained by re-reading only ECC unit data having an uncorrectable ECC error from the storage devices 1230. Obtaining the reliability information will be described with reference to FIG. 15.

When the reliability information is obtained, a data value of ECC unit data having an uncorrectable ECC error may be estimated. Afterwards, in the operation S355, the recovery operator 170 may recover ECC unit data having an uncorrectable ECC error, based on the reliability information, the successfflly read ECC unit data EU[1][3] and EU[2][3] in the third order, and the third ECC unit data EU[5][3] of the parity P. Such a recovery operation will be described with reference to FIG. 16.

According to at least some example embodiments of the inventive concepts, a recovery operation with respect to the second order may be performed according to the operation S345, and a recovery operation with respect to the third order may be performed according to the operations S350 and S355. According to at least some example embodiments of the inventive concepts, when uncorrectable ECC errors more than the reference value occur in the specific order (i.e., the third order), a recovery operation according to the operations S350 and S355 may be performed, without the operation S345, with respect to all the orders.

Figure 15:
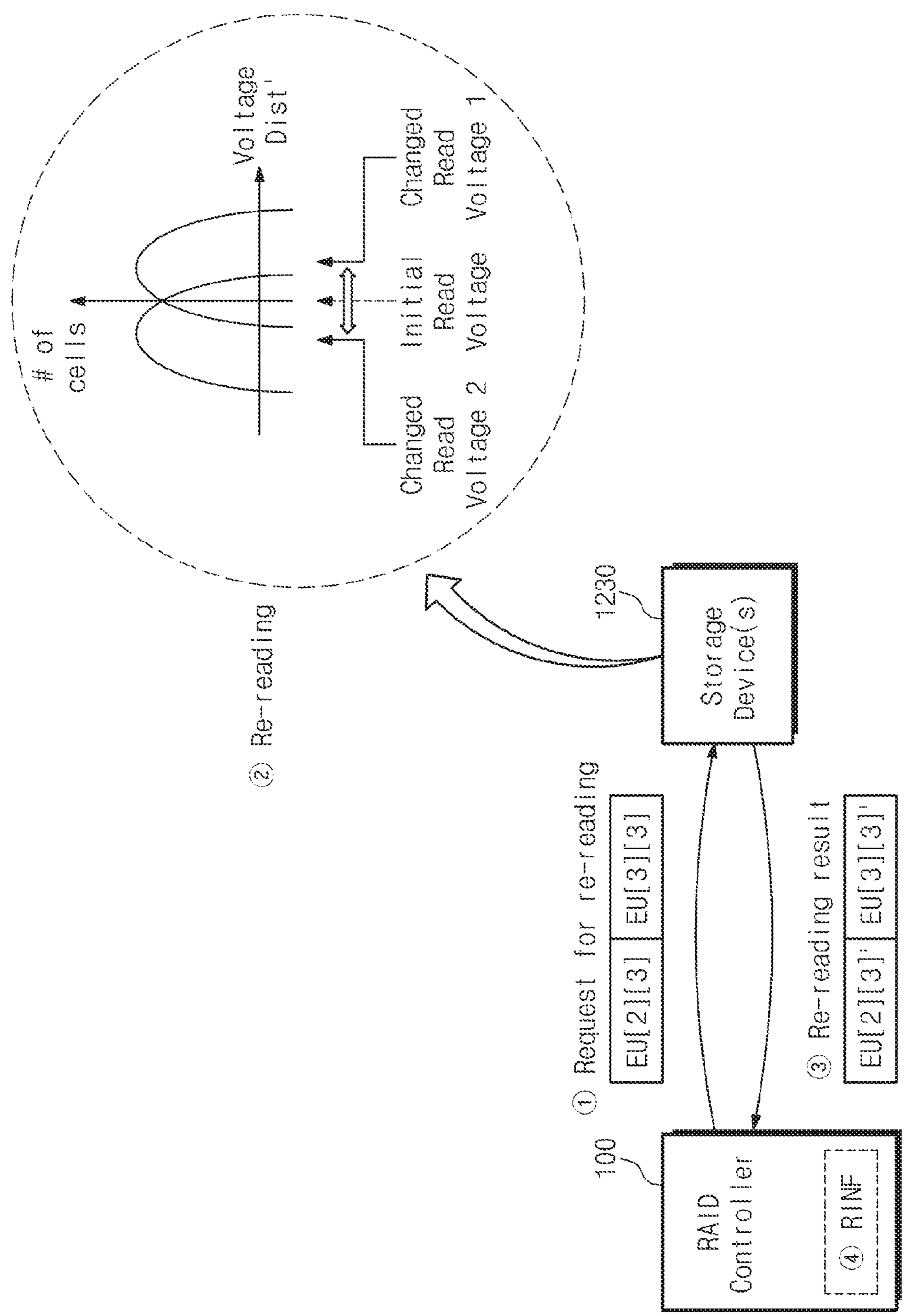
FIG. 15 is a conceptual diagram for describing a process of performing a re-read operation to generate reliability information in the process of FIG. 14.

FIG. 15 is a conceptual diagram for describing a process of performing a re-read operation to generate reliability information, in the process of FIG. 14. To help facilitate understanding, FIGS. 1 and 6 will be referred together with FIG. 15. A process of FIG. 15 will be described based on the example of FIG. 13 and the process of FIG. 14.

When uncorrectable ECC errors more than the reference value occur in the third order like the example of FIG. 13, the RAID controller 100 may transmit a request for re-reading the ECC unit data EU[2][3] and EU[3][3] having an uncorrectable ECC error in the third order to the storage devices 1230 (operation ①). In response to the request, the storage devices 1230 may perform the re-reading operation (operation ②).

As described above, for example, each of the storage devices 1230 may be implemented by an SSD. The SSD may include one or more memory devices of which each includes a plurality of memory cells. A data value included in the memory cell may be read using a specific read voltage.

Before receiving the request from the RAID controller 100, the storage devices 1230 may have read the ECC unit data EU[2][3] and EU[3][3] by means of an initial read voltage. However, as a voltage distribution characteristic of the memory cell is changed, the initial read voltage may have become unsuitable to read a data value. For this reason, the ECC unit data EU[2][3] and EU[3][3] may developed an uncorrectable ECC error.

Thus, the storage devices 1230 may read the ECC unit data EU[2][3] and EU[3][3] again by means of a changed read voltage. As an example, the changed read voltage may include a first changed read voltage having a voltage value lower than the initial read voltage and/or a second changed read voltage having a voltage value higher than the initial read voltage. The storage devices 1230 may select the changed read voltage having an appropriate voltage value, considering a voltage distribution characteristic change of the memory cell.

The storage devices 1230 may transmit the ECC unit data EU[2][3]' and EU[3][3]', that are re-read using the changed read voltage, to the RAID controller 100 (operation ③). The RAID controller 100 may obtain reliability information RINF based on the re-read ECC unit data EU[2][3]' and EU[3][3]' (operation ④).

For example, the RAID controller 100 may obtain the reliability information RINF, considering a relationship between the re-read ECC unit data EU[2][3]' and EU[3][3]', the successfully read ECC unit data EU[1][3] and EU[2][3] in the third order, and the third ECC unit data EU[5][3] of the parity P. For example, the reliability information RINF may include information associated with reliability of the re-read ECC unit data EU[2][3]' and EU[3][3]'.

For example, the reliability information RINF may be determined considering consistency with the successfully read ECC unit data EU[1][3] and EU[2][3] in the third order and the third ECC unit data EU[5][3] of the parity P. For example, when the re-read second ECC unit data EU[2][3]' shows higher consistency with other data and parity than the re-read third ECC unit data EU[3][3]', the reliability information RINF may indicate that the re-read second ECC unit data EU[2][3]' has higher reliability than the re-read third ECC unit data EU[3][3]'.

The ECC circuits 1235 may output "hard decision information" associated with whether an ECC error of ECC unit data is uncorrectable or correctable. On the other hand, the reliability information RINF may correspond to "soft decision information" associated with reliability of ECC unit data and possibility of an ECC error occurring. For example, an error correction scheme such as a LDPC code, a turbo code, and/or the like may be employed to obtain. the reliability information RINF.

Figure 16:
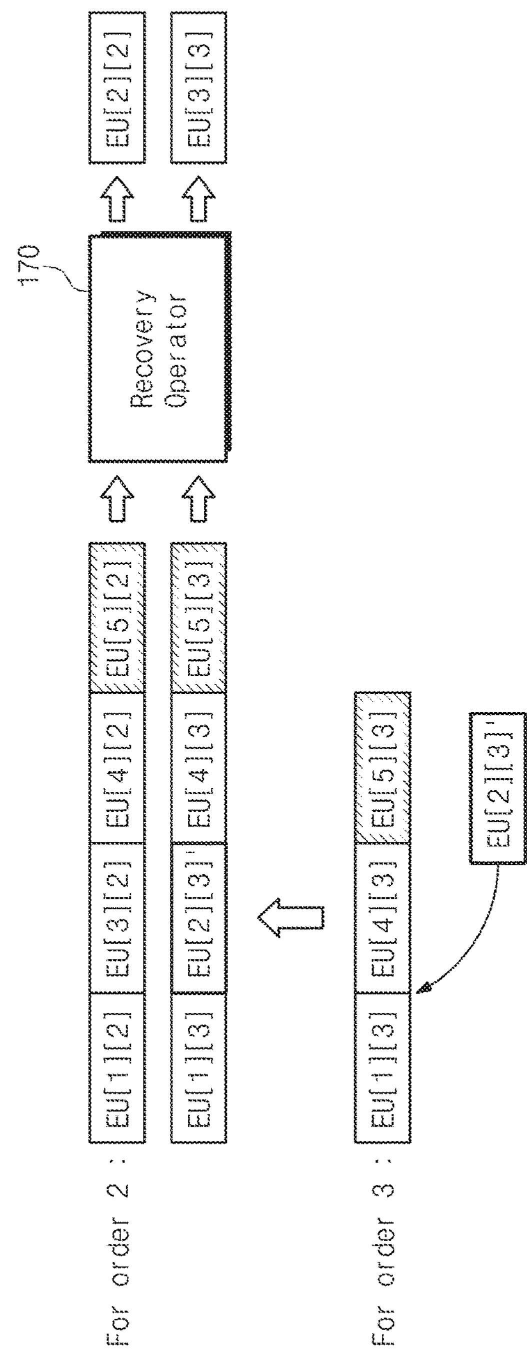
FIG. 16 is a conceptual diagram for describing a process of recovering the uncorrectable error of FIG. 13 by means of the processes of FIGS. 14 and 15.

FIG. 16 is a conceptual diagram for describing a process of recovering the uncorrectable error of FIG. 13 by means of the processes of FIGS. 14 and 15. To help better understanding, FIGS. 1 and 6 will be referred together with FIG. 16. A process of FIG. 16 may be performed after obtaining the reliability information RINF in the process of FIG. 15.

As described with reference to FIG. 15, for example, the reliability information RINF may indicate that the re-read second ECC unit data EU[2][3]' has higher reliability than the re-read third ECC unit data EU[3][3]'. This may mean that the initially read second ECC unit data Eu[2][3] has lower reliability than the initially read third ECC unit data EU[3][3].

In the above example, the controller 110 or the recovery operator 170 may set e.g., change or alte data value of the second ECC unit data EU[2][3] having low reliability to a data value of the re-read second ECC unit data EU[2][3]'. Accordingly, in the third order, the re-read second ECC unit data EU[2][3]' may be provided to the recovery operator 170 together with the successfully read ECC unit data EU[1][3] and EU[4][3].

The recovery operator 170 may recover the ECC unit data EU[3][3] having an uncorrectable ECC error, based on the successfully read ECC unit data EU[1][3] and EU[4][3], the third ECC unit data EU[5][3] of the parity P, and the re-read second ECC unit data EU[2][3]'. A recovery operation with respect to the second order may be performed similarly to the example of FIG. 12.

To sum up, according to the example embodiment of FIG. 14, some ECC unit data having an uncorrectable ECC error may be processed (e.g., refined or updated) to have high reliability, based on the reliability information. Further, some other ECC unit data having an uncorrectable ECC error may be recovered using the processed/refined ECC unit data.

The example embodiment of FIG. 14 may be configured to recover an uncorrectable ECC error of two or more data chunks. Further, the example embodiment of FIG. 14 may be configured to recover an uncorrectable ECC error beyond the recovery capability, using hard decision information and soft decision information without additional parity. Thus, the RAID controller 100 that operates according to the example embodiment of FIG. 14 may have higher recovery capability, and the overhead of the RAID controller 100 may not greatly increase.

Figure 17:
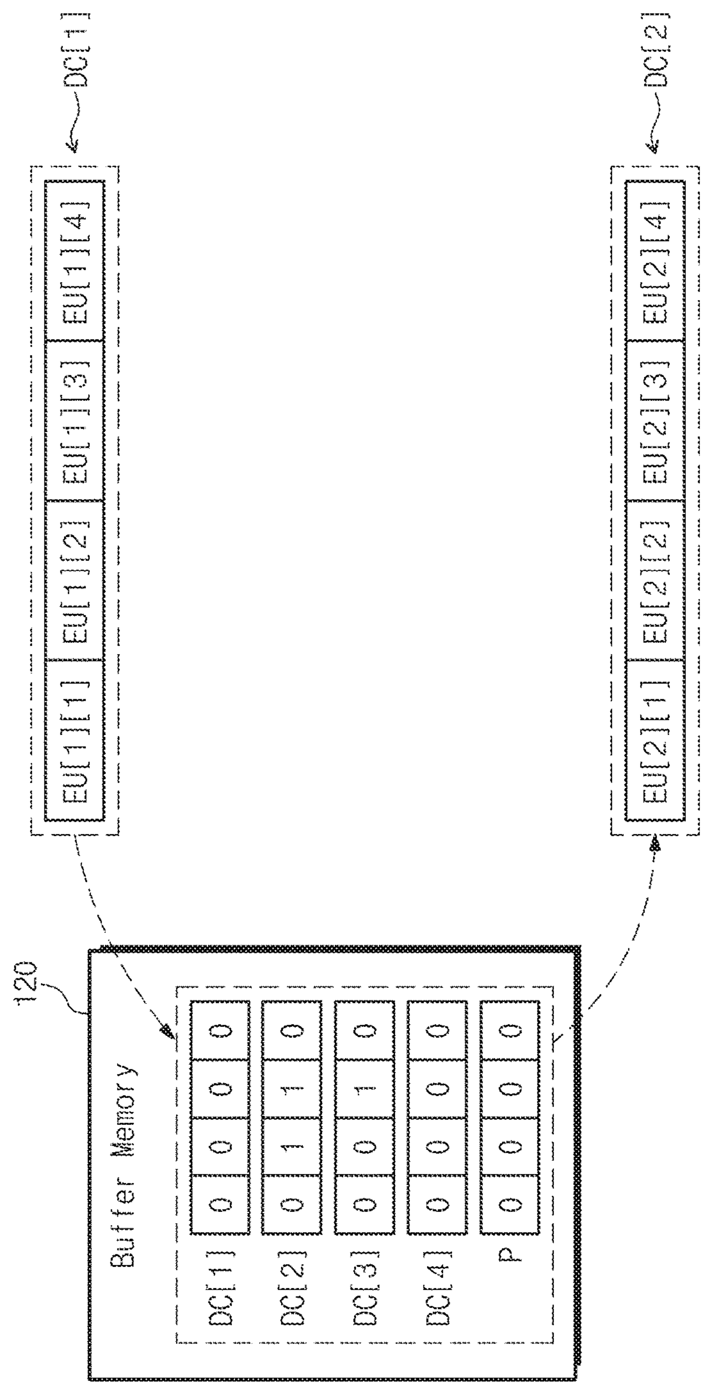
FIG. 17 is a conceptual diagram for describing a process of managing ECC result indicators in the RAID controller of FIG. 6.

FIG. 17 is a conceptual diagram for describing a process of managing ECC result indicators in the RAID controller of FIG. 6. To help facilitate understanding, FIGS. 1 and 6 will be referred together with FIG. 17

As described above, one data chunk may correspond to a read unit of a read operation being performed in the storage devices 1230. Thus, the processes, described with reference to FIGS. 7 through 16, for checking an uncorrectable ECC error and recovering ECC unit data may be performed on each of a plurality of data chunks.

For example, ECC result indicators may be generated for a first data chunk DC[1]. These ECC result indicators may be stored in the buffer memory 120 or the ECC result manager 130. In some cases, after a read operation and a recovery operation with respect to the first data chunk DC[1] are completed, the stored ECC result indicators may be removed (e.g., erased).

After that, ECC result indicators may be generated for a second data chunk DC[2]. However, the ECC result indicators for the second data chunk DC[2] may be substantially the same as the ECC result indicators for the first data chunk DC[1]. Thus, it may be inefficient to generate the ECC result indicators for the second data chunk DC[2] after removing the ECC result indicators for the first data chunk DC[1].

Therefore, according to at least some example embodiments of the inventive concepts, if ECC result indicators are generated once, the generated ECC result indicators may be maintained (e.g., stored continuously) in the buffer memory 120 or the ECC result manager 130 until read operations and recovery operations are completed with respect to all data chunks included in one stripe. For example, the buffer memory 120 or the ECC result manager 130 may continuously store the ECC result indicators that have been referred to in order to recover ECC unit data having an uncorrectable ECC error in the first data chunk DC[1]. The RAID controller 100 may refer to the ECC result indicators stored in advance in the buffer memory 120 or the ECC result manager 130, instead of removing and re-generating the ECC result indicators, to recover ECC unit data having an uncorrectable ECC error in the second data chunk DC[2]. According to such an example embodiment, speed and efficiency of the recovery operation may be improved.

Figure 18:
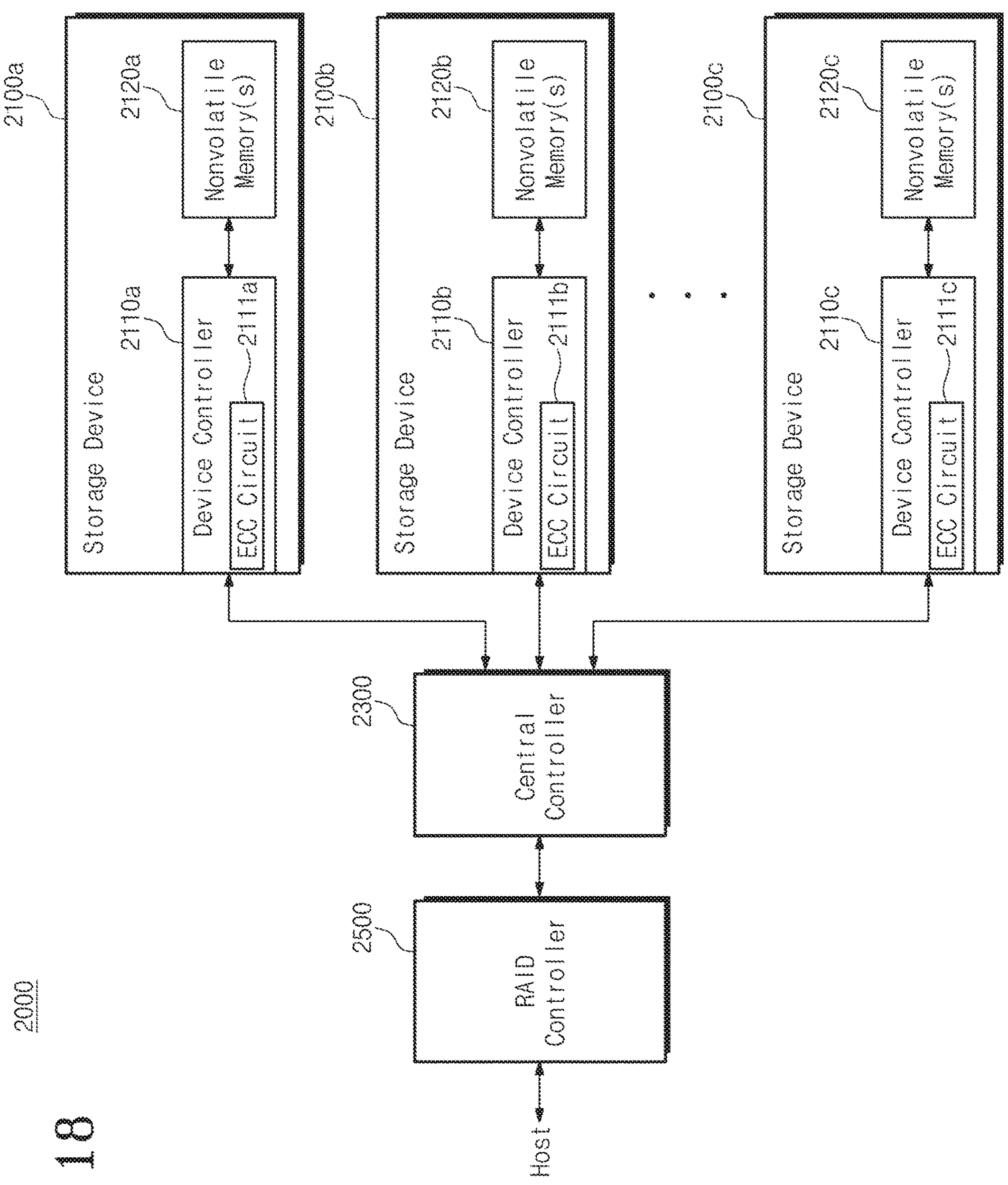
FIG. 18 is a block diagram illustrating a RAID storage system that includes a RAID controller and a plurality of storage devices in accordance with at least some example embodiments of the inventive concepts.

FIG. 18 is a block diagram illustrating a RAID storage system that includes a RAID controller and a plurality of storage devices in accordance with at least some example embodiments of the inventive concepts.

According to at least some example embodiments of the inventive concepts, a RAID storage system 2000 may include a plurality of storage devices 2100*a*, 2100*b*, and 2100*c*. The storage devices 2100*a*, 2100*b*, and 2100*c* may dispersively store a plurality of data chunks and a parity included in one stripe.

The storage devices 2100*a*, 2100*b*, and 2100*c* may include device controllers 2110*a*, 2110*b*, and 2110*c*, respectively. The device controllers 2110*a*, 2110*b*, and 2110*c* may control the overall operations of the storage devices 2100*a*, 2100*b*, and 2100*c*. For example, the device controllers 2110*a*, 2110*b*, and 2110*c* may include ECC circuits 2111*a*, 2111*b*, and 2111*c*, respectively. The ECC circuits 2111*a*, 2111*b*, and 2111*c* may perform ECC decoding operations on a plurality of ECC unit data included in the stored data chunks.

The storage devices 2100*a*, 2100*b*, and 2100*c* may include nonvolatile memories 2120*a*, 2120*b*, and 2120*c*, respectively. The nonvolatile memories 2120*a*, 2120*b*, and 2120*c* may include memory regions configured to store data chunk(s). The nonvolatile memories 2120*a*, 2120*b*, and 2120*c* may include a nonvolatile memory such as a flash memory, a PRAM, a ReRAM, a FRAM, and/or the like.

According to at least some example embodiments of the inventive concepts, the RAID storage system 2000 may further include a central controller 2300. The central controller 2300 may manage operations of the device controllers 2110*a*, 2110*b*, and 2110*c*. For example, the central controller 2300 may manage an input/output of data and a distribution of data chunks through the device controllers 2110*a*, 2110*b*, and 2110*c*.

As illustrated in FIG. 18, the central controller 2300 may be implemented in an independent circuit or device. Alternatively, some or all of functions of the central controller 2300 may be included in the device controllers 2110*a*, 2110*b*, and 2110*c*, or may be included in a RAID controller 2500.

The RAID storage system 2000 may include the RAID controller 2500. The RAID controller 2500 may include the RAID controller 100 of FIG. 6. The RAID controller 2500 may operate according to at least some example embodiments of the inventive concepts described with reference to FIGS. 7 through 17.

For example, the RAID controller 2500 may manage information of ECC result indicators, based on results of ECC decoding operations received from the ECC circuits 2111*a*, 2111*b*, and 2111*c*. The RAID controller 2500 may recover a data chunk that includes ECC unit data having an uncorrectable ECC error, with reference to the ECC result indicators. The RAID controller 2500 may provide a host with a stripe including the recovered data chunk. For brevity, some redundant descriptions will be omitted from the description of FIG. 18.

As illustrated in FIG. 18, the RAID controller 2500 may be implemented in an independent circuit or device. Alternatively, some or all of functions of the RAID controller 2500 may be included in the central controller 2300, or may be distributed to the device controllers 2110*a*, 2110*b*, and 2110*c*.

The RAID controller 2500 may support a multi-channel communication according to the number of the storage devices 2100*a*, 2100*b*, and 2100*c*. According to at least some example embodiments of the inventive concepts, the RAID controller 2500 may be implemented by separate circuits or devices as much as the number of the storage devices 2100*a*, 2100*b*, and 2100*c*. According to at least some example embodiments of the inventive concepts, the ECC circuits 2111*a*, 2111*b*, and 2111*c* may be implemented in one circuit or device, and thus may be configured to correspond to one RAID controller 2500.

As described above, the RAID controller 2500 may include several memory regions. However, according to at least some example embodiments of the inventive concepts, the RAID controller 2500 may share a memory region of the host and/or the storage devices 2100*a*, 2100*b*, and 2100*c*. At least some example embodiments of the inventive concepts may be variously changed or modified.

Figure 19:
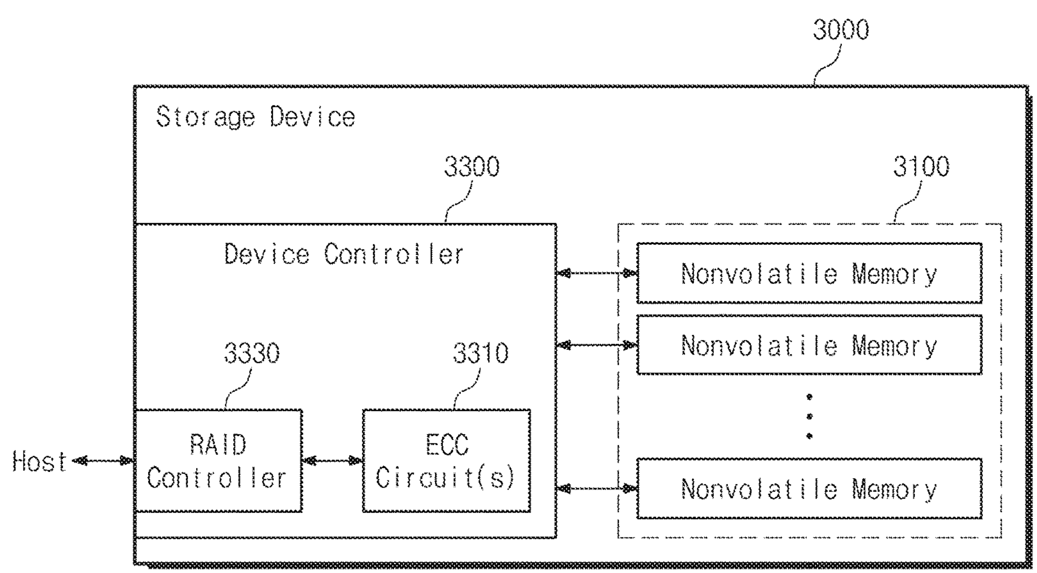
FIG. 19 is a block diagram illustrating a storage device that includes a RAID controller in accordance with at least some example embodiments of the inventive concepts.

FIG. 19 is a block diagram illustrating a storage device that includes a RAID controller in accordance with at least some example embodiments of the inventive concepts.

According to at least some example embodiments of the inventive concepts, the RAID storage device 1200 of FIG. 1 may be implemented in one storage device 3000. The storage device 3000 may include a plurality of nonvolatile memory devices 3100. The nonvolatile memory devices 3100 may dispersively store a plurality of data chunks and a parity included in one stripe. The nonvolatile memory devices 3100 may include a nonvolatile memory examples of which include, but are not limited to, a flash memory, a PRAM, a ReRAM, a MRAM, and/or a FRAM.

The storage device 3000 may include a device controller 3300. The device controller 3300 may control the overall operations of the storage device 3000. For example, the device controller 3300 may include one or more ECC circuits 3310. The ECC circuits 3310 may perform. ECC decoding operations on a plurality of ECC unit data included in the stored data chunk(s).

The device controller 3300 may include the RAID controller 3330. The RAID controller 3330 may include the RAID controller 100 of FIG. 6. The RAID controller 3330 may operate according to at least some example embodiments of the inventive concepts described with reference to FIGS. 7 through 17

For example, The RAID controller 3330 may manage information of ECC result indicators, based on results of ECC decoding operations received from the ECC circuits 3310. The RAIL) controller 3330 may recover a data chunk that includes ECC unit data having an uncorrectable ECC error, with reference to the ECC result indicators. The RAID controller 3330 may provide a host with a stripe including the recovered data chunk. For brevity, redundant descriptions will be omitted.

As illustrated in FIG. 19, the RAID controller 3330 may be included in the device controller 3300. Alternatively, the RAID controller 3330 may be configured separately from the device controller 3300, or may be configured separately from the storage device 3000.

The RAID controller 3330 may support a multi--channel communication according to the number of the nonvolatile memory devices 3100. According to at least some example embodiments of the inventive concepts, the RAIL) controller 3330 may be implemented by separate circuits as much as the number of the nonvolatile memory devices 3100. According to at least some example embodiments of the inventive concepts, the ECC circuits 3310 may be implemented by separate circuits as much as the number of channels being supported by the RAID controller 3330 or as much as the number of the nonvolatile memory devices 3100.

As described above, the RAID controller 3330 may include several memory regions. However, According to at least some example embodiments of the inventive concepts, the RAID controller 3330 may share a memory region of the host, the device controller 3300, and/or the storage device 3000. At least some example embodiments of the inventive concepts may be variously changed or modified.

According to at least some example embodiments of the inventive concepts, a data chunk including an uncorrectable error may be recovered. Thus, the RAID storage system or the storage device may guarantee high reliability of data. Furthermore, the RAID storage controller may not require additional parity to recover a data chunk. Thus, the overhead of the RAID storage system or the storage device may not greatly increase.

Circuits, chips, and devices according to at least some example embodiments of the inventive concepts may be mounted using various kinds of semiconductor packages. For example, circuits, chips, and devices according to at least some example embodiments of the inventive concepts may be mounted using a package such as package on package (PoP), bail grid arrays (BGAs), chip scale packages (CSPs), plastic leaded chip carrier (PLCC), plastic dual in-line package (PDIP), die in. waffle pack, die in wafer form, chip on board (COB), ceramic dual in-line package (CERDIP), metric quad flat pack (MQFP), small outline integrated circuit (SOIC), shrink small outline package (SSOP), thin small outline package (TSOP), thin quad flat pack (TQFP), system in package (SIP), multi-chip package (MCP), wafer-level fabricated package (WFP),and/or wafer-level processed stack package (WSP).

Example embodiments of the inventive concepts having thus been described, it will be obvious that the same may be varied in. many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A redundant array of inexpensive disks (RAID) controller device configured to manage data handling operations of a RAID storage system that includes one or more storage devices, the RAID controller device comprising:

an error correction code (ECC) result manager configured to manage information of ECC result indicators when a data chunk that includes one or more ECC data units having an uncorrectable ECC error is read from among a plurality of data chunks, the plurality of data chunks being dispersively stored in the one or more storage devices, each of the plurality of data chunks including a plurality of ECC data units, the ECC result indicators respectively indicating whether the plurality of ECC data units included in the plurality of data chunks has an uncorrectable ECC error;

an uncorrectable error counter configured to calculate a number of ECC result indicators indicating an uncorrectable ECC error among ECC result indicators corresponding to ECC data units having a same order in each of the plurality of data chunks; and a recovery operator configured to recover ECC data units having an uncorrectable ECC error when the calculated number does not exceed a reference value, the recovery operator being configured to perform the recovering based on successfully read ECC data units among the ECC data units having the same order in each of the plurality of data chunks and a parity having a corresponding order.

2. The RAID controller device of claim 1, wherein the recovery operator is configured to perform the recovering such that, when one data chunk among the plurality of data chunks includes one or more ECC data units having an uncorrectable ECC error, the recovery operator recovers the one or more ECC data units that are included in the one data chunk and have an uncorrectable ECC error, and wherein the RAID controller device is configured such that, when two or more data chunks among the plurality of data chunks include one or more ECC data units having an uncorrectable ECC error, the RAID controller device outputs a read fail response.

3. The RAID controller device of claim 1, wherein, the recovery operator is configured such that, when the calculated number does not exceed the reference value, the recovery operator recovers one or more ECC data units having an uncorrectable ECC error, regardless of a number of data chunks that include one or more ECC data units having an uncorrectable ECC error among the plurality of data chunks.

4. The RAID controller device of claim 3, wherein the RAID controller device is configured to output a read fail response when the calculated number exceeds the reference value.

5. The RAID controller device of claim 3, wherein the recovery operator is configured such that, when the calculated number exceeds the reference value, the recovery operator recovers one or more ECC data units having an uncorrectable ECC error in the corresponding order, based on reliability information, the successfully read ECC data units, and the parity having the corresponding order, and wherein the RAID controller device is configured to obtain the reliability information by re-reading some or all of data values of the plurality of data chunks from the one or more storage devices.

6. The RAID controller device of claim 5, wherein the RAID controller device is configured to obtain the reliability information by re-reading only ECC data units having an uncorrectable ECC error from the one or more storage devices.

7. The RAID controller device of claim 5, wherein the RAID controller device is configured to re-read some or all of the data values of the plurality of data chunks using a read voltage that is changed such that the reliability information is obtained.

8. The RAID controller device of claim 5, wherein the RAID controller device is configured such that, when the calculated number exceeds the reference value, the RAID controller device sets a data value of an ECC data unit having lowest reliability among the one or more ECC data units having an uncorrectable ECC error in the corresponding order to the re-read data values, based on the reliability information, and wherein the recovery operator is configured to recover an ECC data unit having an uncorrectable ECC error, based on the successfully read ECC data units, the parity having the corresponding order, and the ECC data unit having the set data values.

9. The RAID controller device of claim 1, wherein a data size of each of the plurality of data chunks is larger than a data size of each of the plurality of ECC data units.

10. The RAID controller device of claim 1, wherein a data size of each of the plurality of data chunks corresponds to a data size of a read unit of a read operation that is performed in the one or more storage devices.

11. A storage device comprising:

a plurality of nonvolatile memory devices configured to dispersively store a plurality of ECC data units, the ECC data units being arranged in a plurality of data chunks and a plurality of orders such that each ECC data unit, from among the plurality of ECC data units, belongs to one data chunk from among the plurality of data chunks and one order from among the plurality of orders; and a device controller configured to manage data handling operations of the plurality of nonvolatile memory devices, wherein the device controller includes, an error correction code (ECC) circuit configured to perform a first decoding operation and output a result of the first decoding operation, the first decoding operation including, performing an ECC decoding operation, by an ECC unit, on each data chunk, from among the plurality of data chunks, that is read from the plurality of nonvolatile memory devices, and a redundant array of inexpensive disks (RAID) controller configured to, based on the result of the first decoding operation, manage information of a plurality of ECC result indicators corresponding, respectively, to the plurality of ECC data units such that each ECC result indicator indicates whether the ECC data unit to which the ECC result indicator corresponds has an uncorrectable ECC error, and recover a first ECC data unit, from among the plurality of ECC data units, that has an uncorrectable ECC error, the recovering being based on, the plurality of ECC result indicators and second ECC data units, the second ECC data units being successfully read ECC data units, from among the plurality of ECC data units, that belong to a same order, from among the plurality of orders, as the order to which the first ECC data unit belongs.

12. The storage device of claim 11, wherein the RAID controller is configured to receive the results of the first decoding operation of the plurality of data chunks from the ECC circuit when a data chunk that includes an ECC data unit having an uncorrectable ECC error is read from among the plurality of data chunks.

13. The storage device of claim 11, wherein the RAID controller is configured such that, the RAID controller recovers the first ECC data unit based on the second ECC data units when a data chunk that includes the first ECC data unit is read from among the plurality of data chunks and, for each order among the plurality of orders, a total number of ECC data units having an uncorrectable ECC error among the ECC data units of the order does not exceed a reference value.

14. The storage device of claim 11, wherein the RAID controller is configured to perform a recovery operation using only the first ECC data unit having an uncorrectable ECC error, one or more ECC data units that have a same order as the first ECC data unit having an uncorrectable ECC error, and parity that has a same order as the first ECC data unit having an uncorrectable ECC error.

15. The storage device of claim 11, wherein the device controller further includes a buffer memory configured to store the plurality of ECC result indicators that have been referred to in order to recover an ECC data unit having an uncorrectable ECC error in a first data chunk among the plurality of data chunks, and wherein the RAID controller is configured to refer to the stored ECC result indicators in order to recover a second data chunk that includes an ECC data unit having an uncorrectable ECC error among the plurality of data chunks.

16. A redundant array of inexpensive disks (RAID) controller device configured control a data read operation of one or more storage devices of a RAID storage system, the RAID controller device comprising:

a memory storing computer-executable instructions; and one or more processors configured to execute the computer-executable instructions such that the one or more processors are configured to, read data of a data stripe from the one or more storage devices, the data stripe including a plurality of data chunks and at least one parity chunk, each of the plurality of data chunks including a plurality of ECC data units which are included in a plurality of orders, respectively, determine ECC result indicators indicating which data units, from among a first plurality of ECC data units, includes a first type of ECC error, the first plurality of ECC data units including each ECC data unit from among the pluralities of ECC data units included in the plurality of data chunks, determine, for each order of the plurality of orders, an error number such that the error number is a number of ECC data units that are included in the order and include the first type of ECC error, and perform a data recovery operation for a first ECC data unit from among the first plurality of ECC data units based on the error number determined for a first order, the first order being the order from among the plurality of orders in which the first ECC data unit is included.

17. The RAID controller device of claim 16, wherein the one or more processors are configured to execute the computer-executable instructions such that the one or more processors are configured to, perform the data recovery operation for the first ECC data unit when the error number determined for the first order has a first relationship with a reference value, and not perform the data recovery operation for the first ECC data unit when the error number determined for the first order does not have the first relationship with the reference value.

18. The RAID controller device of claim 17, wherein the one or more processors are configured to execute the computer-executable instructions such that the one or more processors are configured to perform the data recovery operation for the first ECC data unit based on second ECC data units when the error number determined for the first order has the first relationship with the reference value, the second ECC data units being data units of the first ECC data units that did not include the first type of ECC error, the second ECC data units being data units included in the first order.

19. The RAID controller device of claim 18, wherein the one or more processors are configured to execute the computer-executable instructions such that the one or more processors are configured to perform the data recovery operation for the first ECC data unit by performing an XOR operation on the second ECC data units when the error number determined for the first order has the first relationship with the reference value.

20. The RAID controller device of claim 16, wherein the first type of ECC error is an uncorrectable ECC error.

* * * * *